(12) United States Patent
Kiyota et al.

(10) Patent No.: US 11,651,876 B2
(45) Date of Patent: May 16, 2023

(54) GROMMET AND WIRE HARNESS

(71) Applicant: Yazaki Corporation, Tokyo (JP)

(72) Inventors: Hirotaka Kiyota, Shizuoka (JP);
Masaru Kiuchi, Shizuoka (JP);
Takeshi Onoda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/480,317

(22) Filed: Sep. 21, 2021

(65) Prior Publication Data

US 2022/0093293 A1 Mar. 24, 2022

(30) Foreign Application Priority Data

Sep. 24, 2020 (JP) .............................. JP2020-160114

(51) Int. Cl.
*B60R 16/02* (2006.01)
*H01B 17/58* (2006.01)

(52) U.S. Cl.
CPC ....... *H01B 17/586* (2013.01); *B60R 16/0222* (2013.01)

(58) Field of Classification Search
CPC . B60R 16/02; B60R 16/0207; B60R 16/0215; B60R 16/0222; H01B 17/586
See application file for complete search history.

(56) References Cited

U.S. PATENT DOCUMENTS

| 1,258,884 | A | * | 3/1918 | Fife | E04D 13/1476 |
| | | | | | 285/43 |
| 4,363,580 | A | * | 12/1982 | Bell | F16B 19/10 |
| | | | | | 411/15 |
| 5,222,334 | A | * | 6/1993 | Hasty | E04D 13/1476 |
| | | | | | 52/219 |
| 5,701,634 | A | * | 12/1997 | Uemura | B60R 16/0222 |
| | | | | | 174/152 G |
| 5,739,475 | A | * | 4/1998 | Fujisawa | B60R 16/0222 |
| | | | | | 174/153 G |
| 6,088,876 | A | * | 7/2000 | Daoud | F16L 5/10 |
| | | | | | 16/2.2 |

(Continued)

FOREIGN PATENT DOCUMENTS

| GB | 2 289 104 A | | 11/1995 | | |
| JP | H10021769 | * | 1/1998 | ......... | B60R 16/0222 |

(Continued)

*Primary Examiner* — Paresh Paghadal
(74) *Attorney, Agent, or Firm* — Sughrue Mion, PLLC

(57) ABSTRACT

A grommet applied to a wire harness includes: a body (10) fitted into a through hole and stops water from entering the through hole; and an umbrella-shaped unit including an annular wall section, a first lip section, and a second lip section, the first lip section and the second lip section abutting an abutting target surface in a state in which the body is fitted into the through hole. The first lip section and the second lip section are provided in the annular wall section so as to be located within an installation region of an insulator when viewed along an axial direction. The umbrella-shaped unit includes a stress concentration section that is provided in an annular shape in the annular wall section on a center axis side with respect to the first lip section, and is located within the installation region when viewed along the axial direction.

17 Claims, 16 Drawing Sheets

(56) References Cited

U.S. PATENT DOCUMENTS

| | | | | |
|---|---|---|---|---|
| 6,173,997 B1* | 1/2001 | Nordstrom | | F16L 5/06 285/139.1 |
| 6,211,464 B1* | 4/2001 | Mochizuki | | B60R 16/0222 16/2.1 |
| 6,353,185 B1* | 3/2002 | Sakata | | H02G 3/18 174/152 G |
| 6,708,366 B2* | 3/2004 | Ono | | B60R 16/0222 16/2.1 |
| 7,434,814 B2* | 10/2008 | Kumakura | | F16L 5/10 174/152 G |
| 8,314,337 B2* | 11/2012 | Fujita | | H02G 3/22 174/153 G |
| 2003/0014924 A1* | 1/2003 | Nakamura | | B60R 13/0846 52/1 |
| 2007/0143956 A1* | 6/2007 | Kumakura | | F16L 5/10 16/2.2 |
| 2011/0198110 A1* | 8/2011 | Fujita | | H02G 3/22 174/153 G |
| 2011/0203833 A1* | 8/2011 | Miyakoshi | | H02G 3/22 174/153 G |
| 2012/0146295 A1* | 6/2012 | Suzuki | | H02G 3/22 277/606 |
| 2012/0217041 A1* | 8/2012 | Agusa | | B60R 16/0222 174/153 G |
| 2012/0285727 A1* | 11/2012 | Shitamichi | | H02G 3/22 174/152 G |
| 2014/0021688 A1* | 1/2014 | Hattori | | H02G 3/088 277/606 |
| 2015/0083236 A1* | 3/2015 | Haynes | | H02G 3/22 137/359 |
| 2015/0129303 A1* | 5/2015 | Shitamichi | | H02G 3/22 174/72 A |

FOREIGN PATENT DOCUMENTS

| | | |
|---|---|---|
| JP | 10-92243 A | 4/1998 |
| JP | 2011-116176 A | 6/2011 |
| JP | 5333165 B2 | 11/2013 |

* cited by examiner

FIG.3
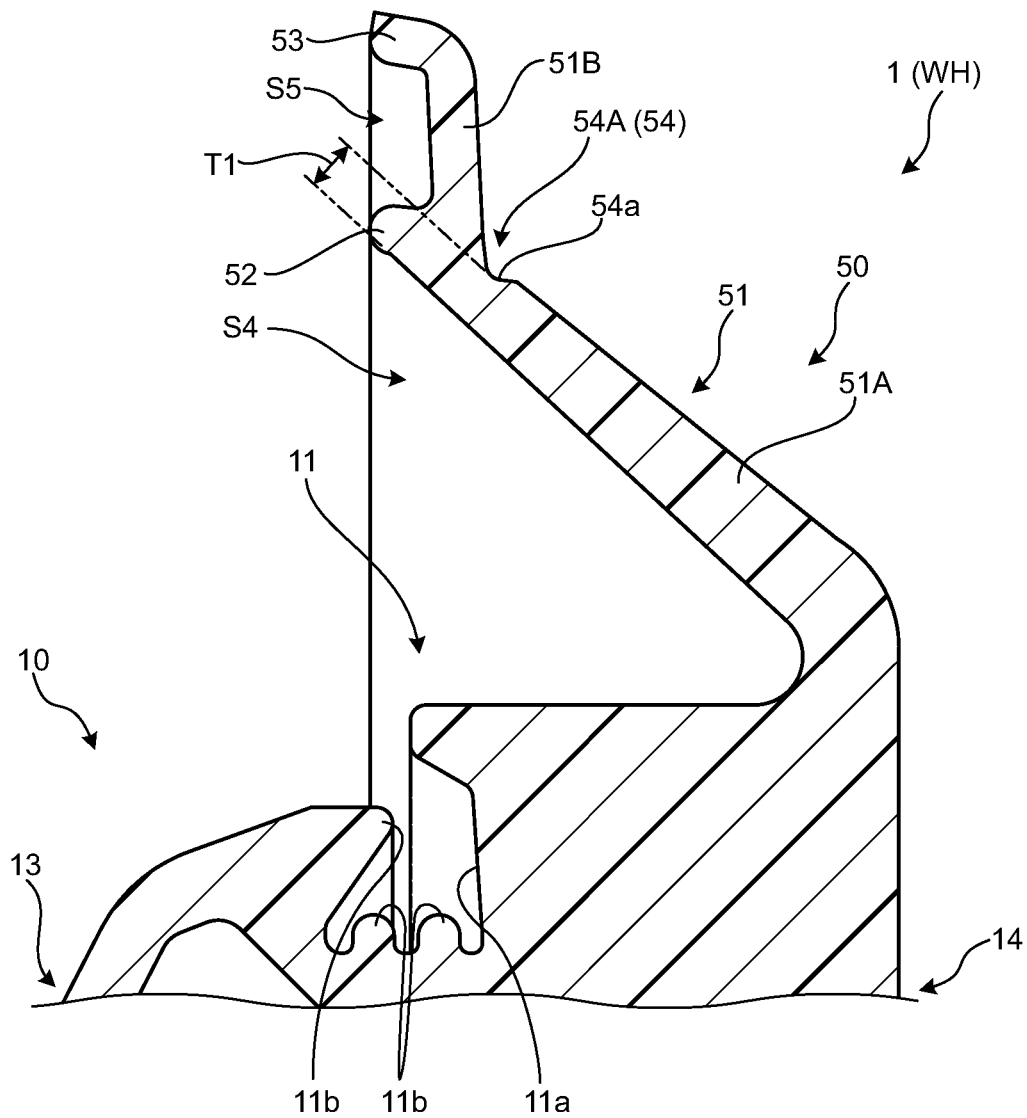
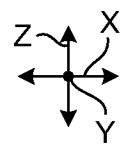

FIG.9
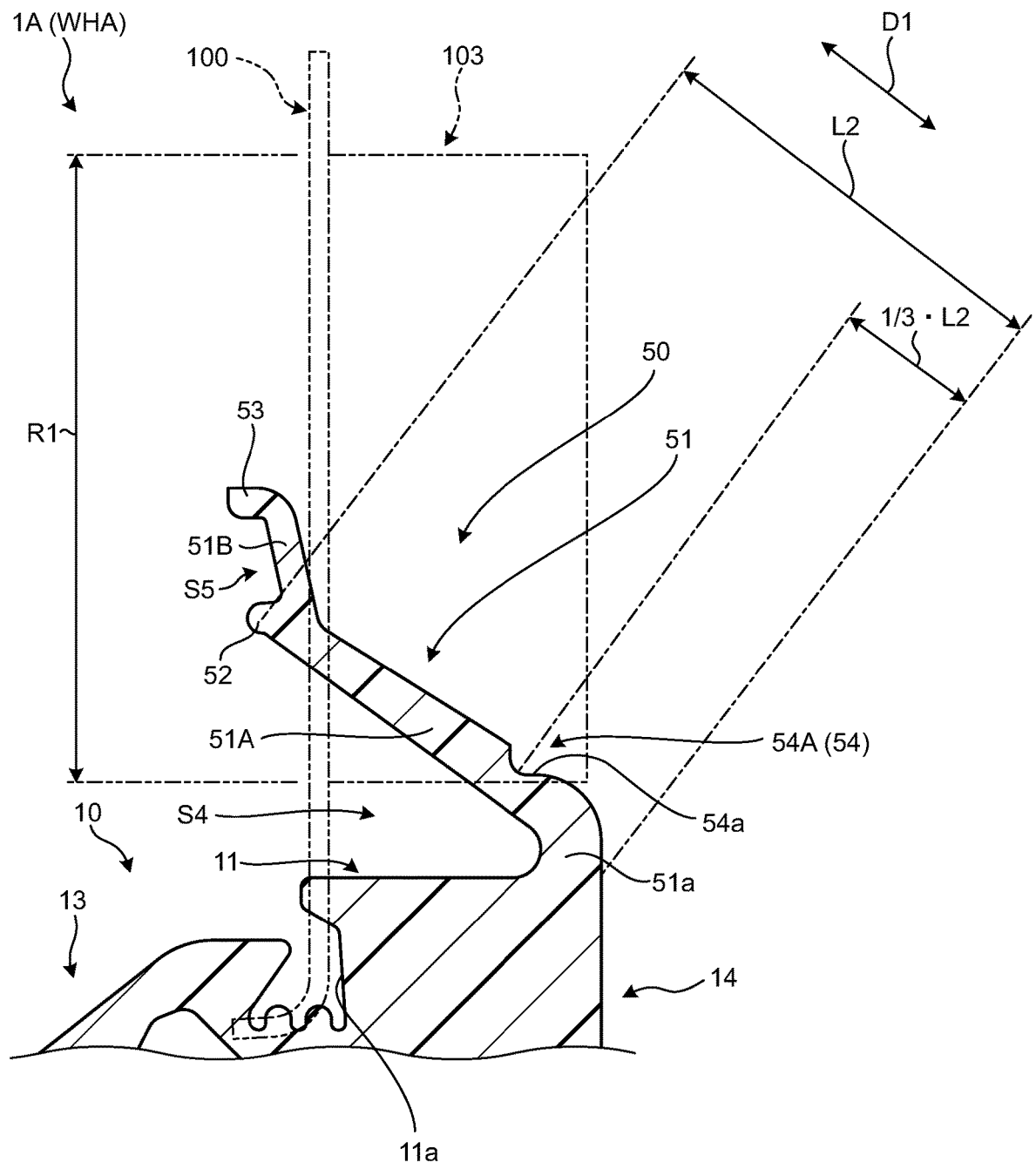
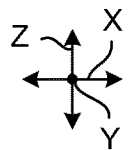

FIG.10
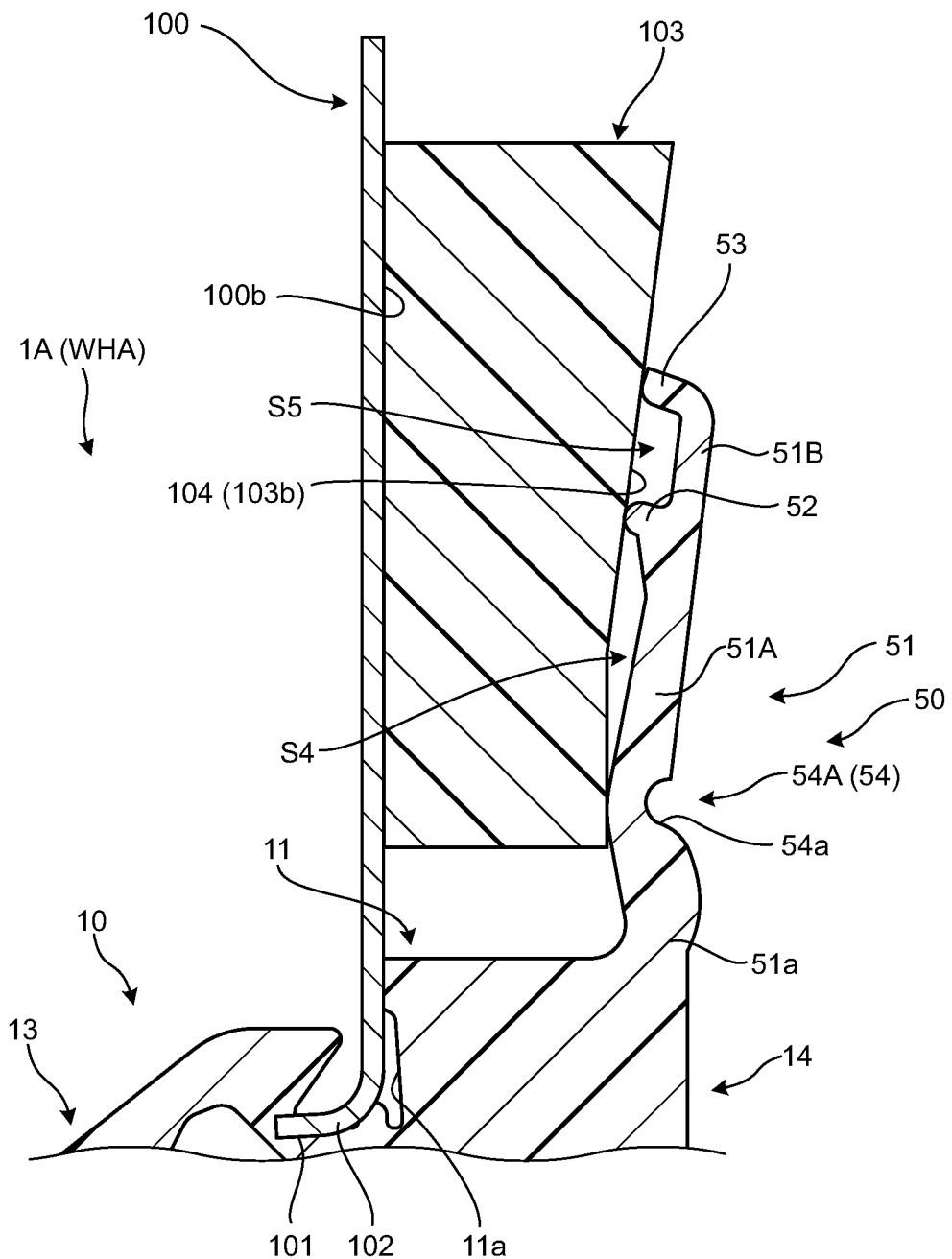
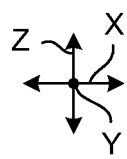

FIG.14
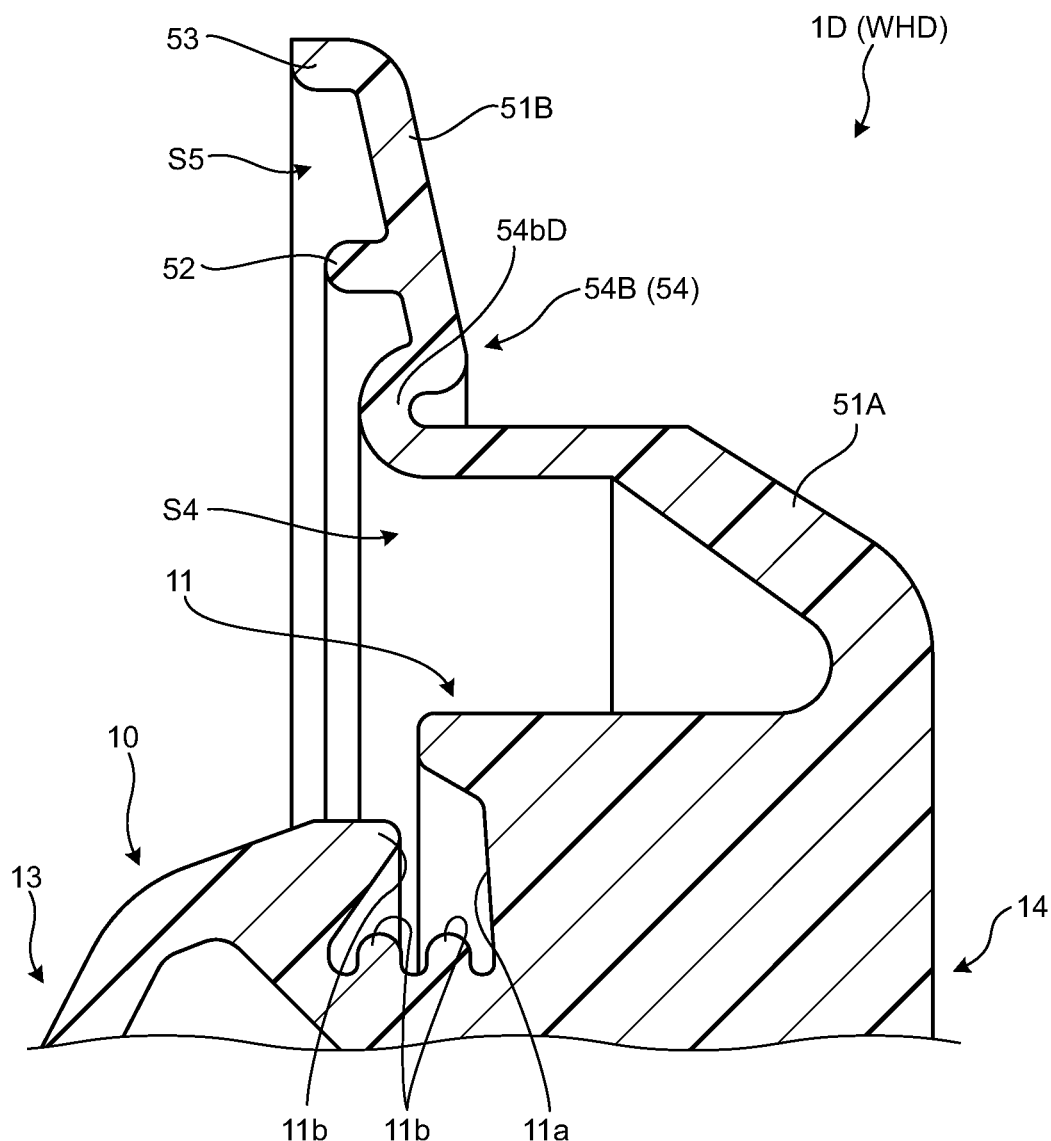
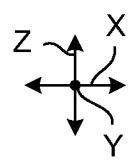

FIG.15
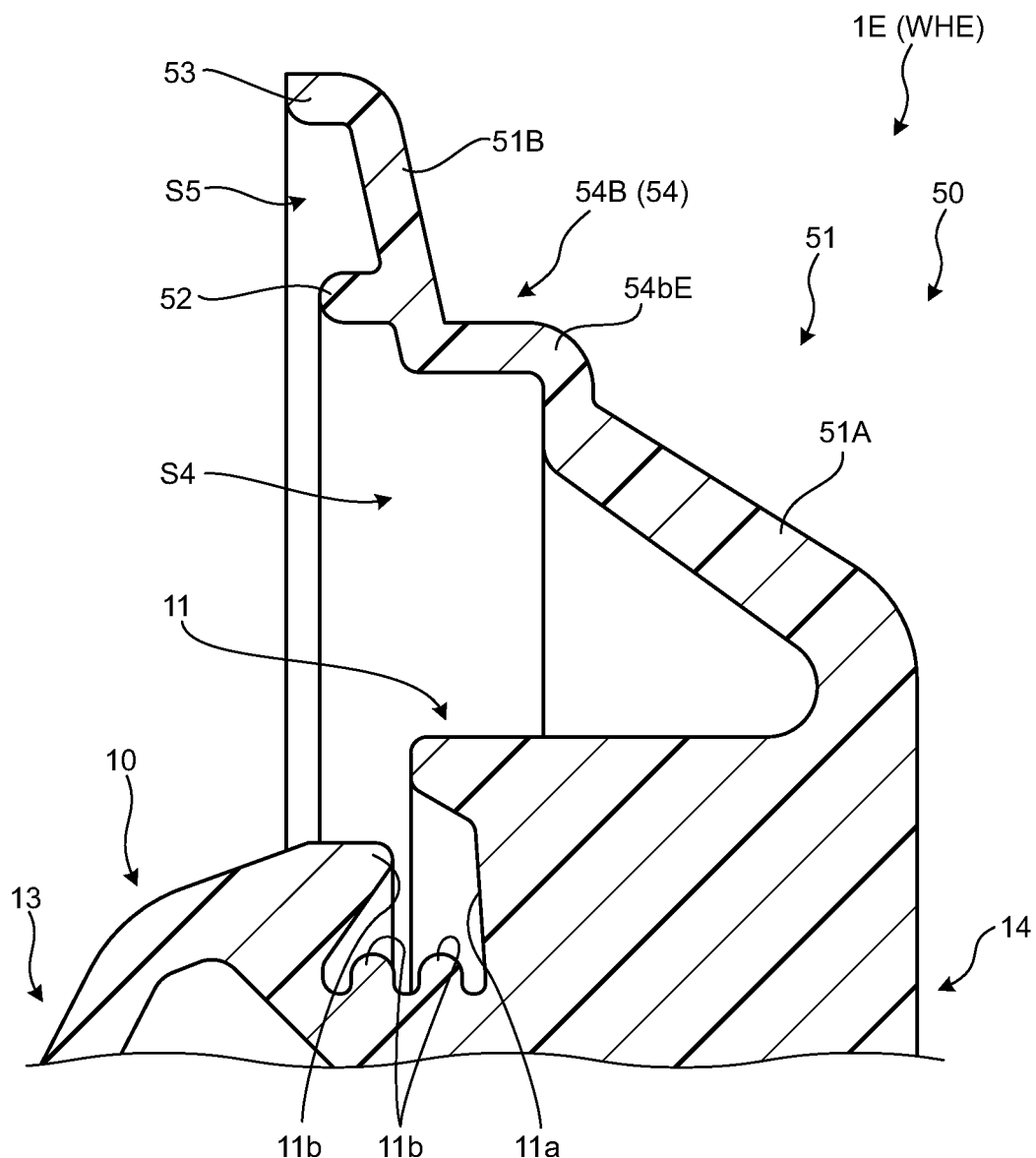
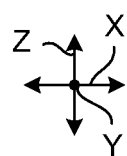

FIG.16
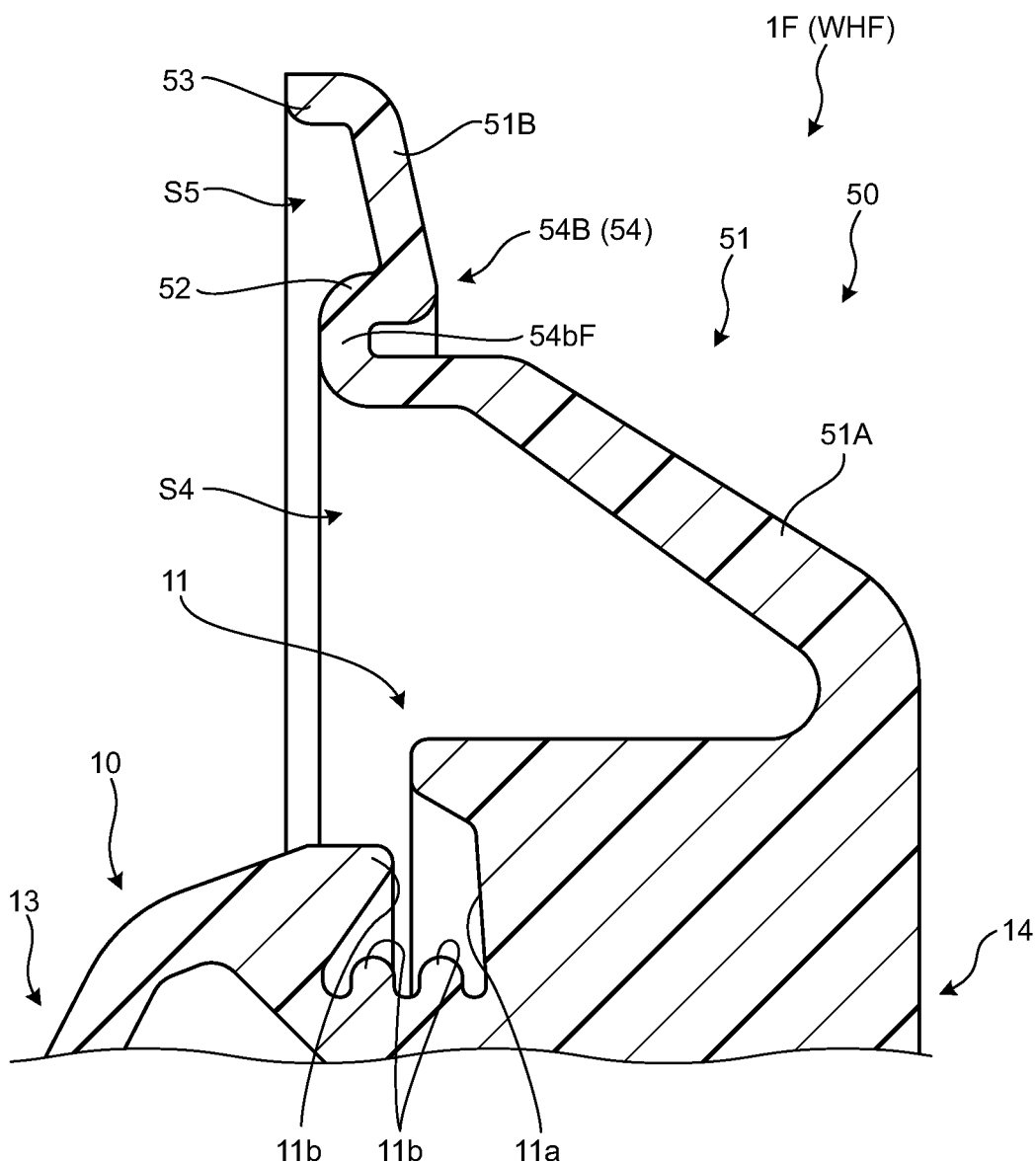
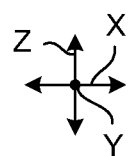

GROMMET AND WIRE HARNESS

CROSS-REFERENCE TO RELATED APPLICATION(S)

The present application claims priority to and incorporates by reference the entire contents of Japanese Patent Application No. 2020-160114 filed in Japan on Sep. 24, 2020.

BACKGROUND OF THE INVENTION

1. Field of the Invention

The present invention relates to a grommet and a wire harness.

2. Description of the Related Art

As a conventional grommet mounted on a vehicle in the related art, for example, Japanese Patent No. 5333165 discloses a vehicle grommet including a first grommet and a second grommet arranged to abut on both surfaces of a body panel on which wire harness through holes are drilled.

The grommet disclosed in Japanese Patent No. 5333165 described above may be applied to different installation environments in the vicinity of the body panel, for example, and a configuration that can ensure a proper installation state regardless of the installation environments is desired.

SUMMARY OF THE INVENTION

Therefore, the present invention has been made in view of the above, and an object of the present invention is to provide a grommet capable of securing a proper installation state and a wire harness.

In order to achieve the above mentioned object, a grommet according to one aspect of the present invention includes a body that is formed in an annular shape around a center axis along an axial direction, and is fitted into a through hole, the through hole being formed in an attachment target, along the axial direction to stop water from entering the through hole, a wiring material being inserted through the body along the axial direction; and an umbrella-shaped unit including an annular wall section that extends from the body to a side opposite to a center axis side and is formed in an annular shape around the body, a first lip section that protrudes from the annular wall section toward the attachment target along the axial direction and is formed in an annular shape with a gap on the side opposite to the center axis side of the body, and a second lip section that protrudes from the annular wall section toward the attachment target along the axial direction and is formed in an annular shape with a gap on the side opposite to the center axis side of the first lip section, the first lip section and the second lip section abutting an abutting target surface provided on the attachment target in a state in which the body is fitted into the through hole, wherein the first lip section and the second lip section are provided in the annular wall section so as to be located within an installation region of an insulator provided around the through hole of the attachment target to surround the through hole when viewed along the axial direction, and the umbrella-shaped unit includes a stress concentration section that is provided in an annular shape in the annular wall section on the center axis side with respect to the first lip section, is located within the installation region when viewed along the axial direction, and is bendable when receiving concentrated stress in a state in which the body is fitted into the through hole and the first lip section and the second lip section abut the abutting target surface.

According to another aspect of the present invention, in the grommet, it is possible to configure that the stress concentration section includes a thin part formed to have a thickness thinner than thicknesses of other portions in the annular wall section.

According to still another aspect of the present invention, in the grommet, it is possible to configure that the stress concentration section includes a bending part formed by being bent in the annular wall section.

According to still another aspect of the present invention, in the grommet, it is possible to configure that the stress concentration section is located adjacent to the first lip section and on the center axis side of the first lip section.

According to still another aspect of the present invention, in the grommet, it is possible to configure that the stress concentration section is located on the center axis side with respect to the first lip section in the annular wall section, and is located in an area separated from a proximal end of the annular wall section on a side of the body toward a side of the first lip section along an extension direction of the annular wall section by ⅓ or more of a length between the proximal end and the first lip section.

In order to achieve the above mentioned object, a wire harness according to still another aspect of the present invention includes a wiring member having conductivity; and a grommet provided on the wiring member, wherein the grommet includes: a body that is formed in an annular shape around a center axis along an axial direction, and is fitted into a through hole, the through hole being formed in an attachment target, along the axial direction to stop water from entering the through hole, the wiring member being inserted through the body along the axial direction; and an umbrella-shaped unit including an annular wall section that extends from the body to a side opposite to a center axis side and is formed in an annular shape around the body, a first lip section that protrudes from the annular wall section toward the attachment target along the axial direction and is formed in an annular shape with a gap on the side opposite to the center axis side of the body, and a second lip section that protrudes from the annular wall section toward the attachment target along the axial direction and is formed in an annular shape with a gap on the side opposite to the center axis side of the first lip section, the first lip section and the second lip section abutting an abutting target surface provided on the attachment target in a state in which the body is fitted into the through hole, wherein the first lip section and the second lip section are provided in the annular wall section so as to be located within an installation region of an insulator provided around the through hole of the attachment target to surround the through hole when viewed along the axial direction, and the umbrella-shaped unit includes a stress concentration section that is provided in an annular shape in the annular wall section on the center axis side with respect to the first lip section, is located within the installation region when viewed along the axial direction, and is bendable when receiving concentrated stress in a state in which the body is fitted into the through hole and the first lip section and the second lip section abut the abutting target surface.

The above and other objects, features, advantages and technical and industrial significance of this invention will be better understood by reading the following detailed descrip-

BRIEF DESCRIPTION OF THE DRAWINGS

FIG. 3 is a partial sectional view including a stress concentration section of the grommet according to the embodiment;

FIG. 9 is a partial sectional view including a stress concentration section of a grommet according to a modification;

FIG. 10 is a partial sectional view including a stress concentration section of the grommet according to the modification;

FIG. 14 is a partial sectional view including a stress concentration section of a grommet according to a modification;

FIG. 15 is a partial sectional view including a stress concentration section of a grommet according to a modification; and FIG. 16 is a partial sectional view including a stress concentration section of a grommet according to a modification.

DETAILED DESCRIPTION OF THE PREFERRED EMBODIMENTS

Hereinafter, embodiments according to the present invention will be described in detail with reference to the drawings. Note that the invention is not limited by the embodiments. Furthermore, components in the following embodiments include those that can be easily replaced by those skilled in the art or those that are substantially the same.

EMBODIMENT

Figure 1:
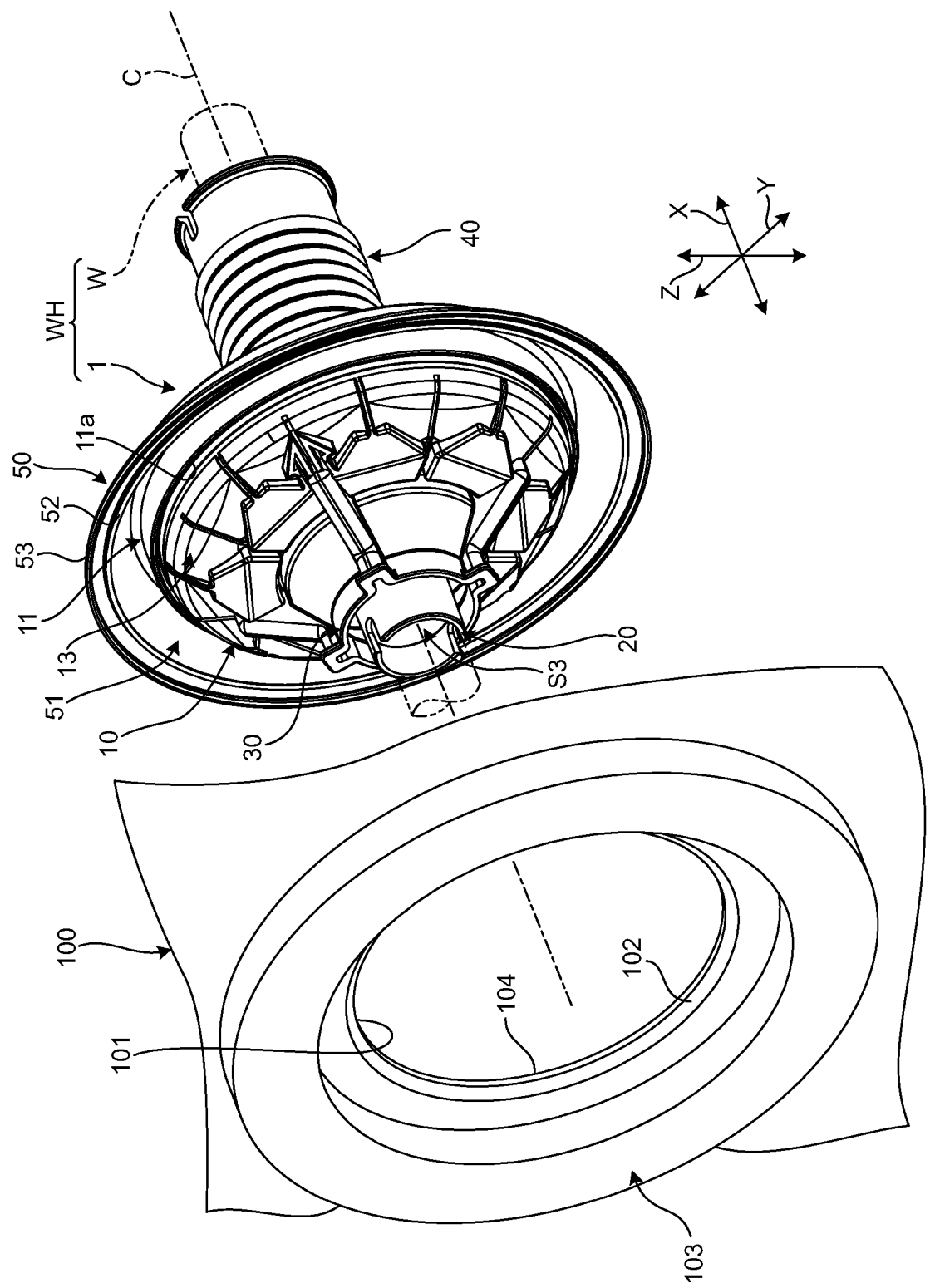
FIG. 1 is a perspective view illustrating a schematic configuration of a grommet according to an embodiment.
Figure 2:
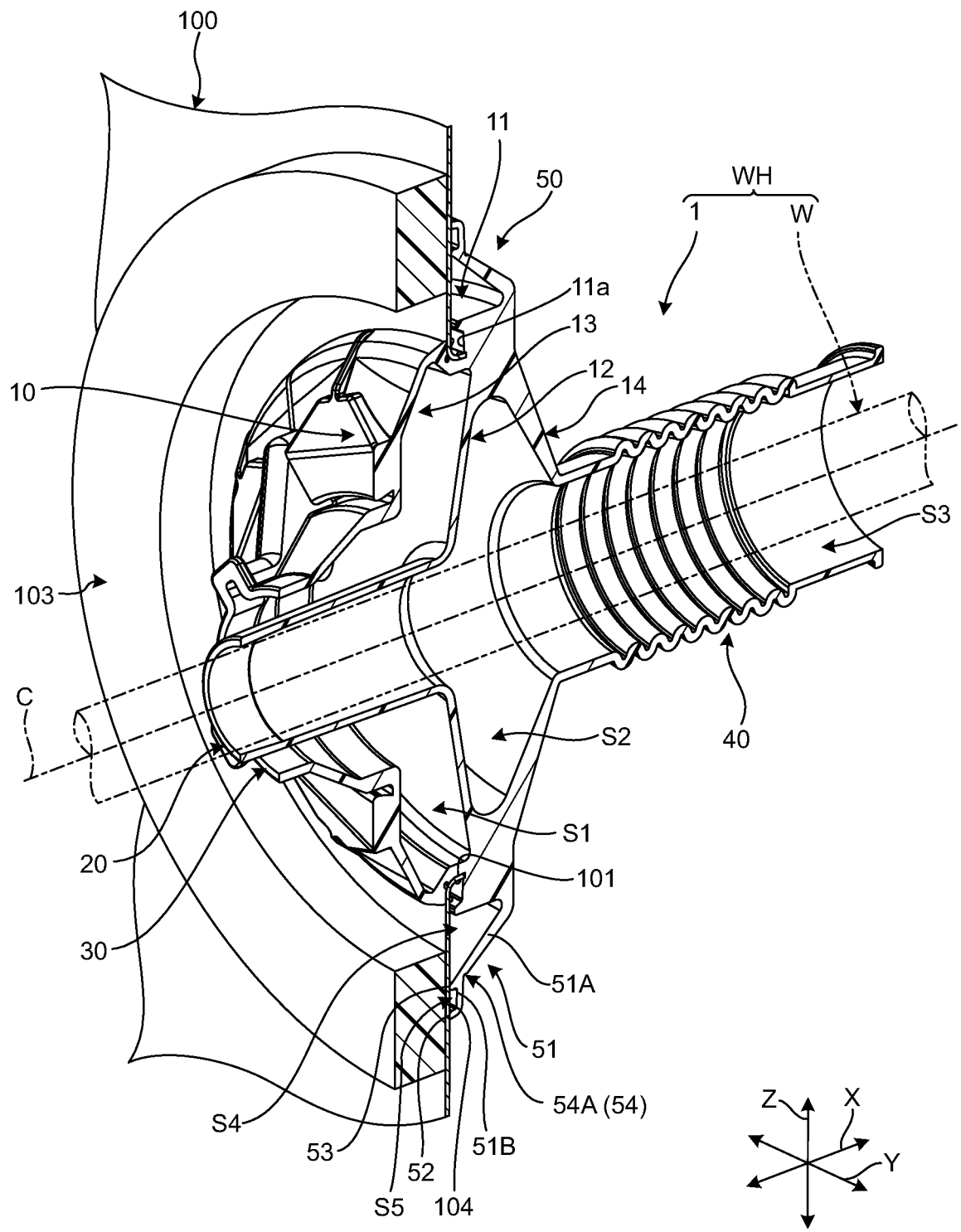
FIG. 2 is a sectional perspective view illustrating a schematic configuration of the grommet according to the embodiment.

A grommet 1 of the present embodiment illustrated in FIG. 1 and FIG. 2 is integrated into a wire harness WH wired in a vehicle and the like. For example, the wire harness WH bundles a plurality of wiring members W used for supplying power and communicating signals into a collective component to connect devices mounted on the vehicle, and connect the wiring members W to the devices with connectors and the like. The wire harness WH includes the wiring members W having conductivity and the grommet 1 provided on the wiring members W and through which the wiring members W are inserted. In addition to the wiring members W and the grommet 1, the wire harness WH may further include various components such as a corrugated tube, a resin tape, an exterior member such as a protector, an electrical connection box, and a fixing tool. The wiring members W include, for example, a metal bar, an electric wire, an electric wire bundle, and the like. The metal bar is obtained by covering the outside of a conductive bar-shaped member with an insulating coating portion. The electric wire is obtained by covering the outside of a conductor portion (core wire) formed of a plurality of conductive metal wires with an insulating coating portion. The electric wire bundle is obtained by bundling such electric wires. The wire harness WH bundles and integrates the wiring members W, and various devices are electrically connected via connectors and the like provided on terminals of the bundled wiring members W.

The grommet 1 is applied to a through hole 101 formed in an attachment panel 100 being an attachment target when the wiring members W are wired across two spaces, which are divided with the attachment panel 100 serving as a boundary, via the through hole 101. The attachment panel 100 is, for example, a metal plate forming a body and the like of the vehicle. The two spaces divided with the attachment panel 100 serving as the boundary are typically a vehicle interior space (for example, a cabin) and a vehicle exterior space (for example, an engine compartment). The through hole 101 penetrates the attachment panel 100 along a plate thickness direction. The attachment panel 100 is subjected to burring processing in the through hole 101, and an inner edge of the through hole 101 projects toward one side in the plate thickness direction to form a rising portion 102. Furthermore, the attachment panel 100 of the present embodiment is provided with an insulator 103. The insulator 103 is a soundproofing component (silencing material) having a function of insulation against vibration. The insulator 103 is provided around the through hole 101 so as to surround the through hole 101. Here, the through hole 101 is formed in a substantially circular shape and the insulator 103 is formed in a substantially annular shape in the drawings; however, the shape of the insulator 103 is not limited thereto. The grommet 1 is assembled to the through hole 101 in a state in which the wiring members W are inserted and the grommet 1 is externally attached to the periphery of the wiring members W, thereby protecting the wiring members W extending through the through hole 101 and stopping water from entering (waterproofing) the through hole 101. The grommet 1 also has functions such as dustproofing and sound insulation in addition to the waterproofing function for the through hole 101.

Furthermore, the grommet 1 of the present embodiment may be applied to different installation environments depending on a difference in a rising direction of the rising portion 102, a difference in an installation surface of the insulator 103, and the like, as illustrated in FIG. 5, FIG. 6, FIG. 7, and FIG. 8 to be described below. In order to address this issue, the grommet 1 of the present embodiment includes a stress concentration section 54 in an umbrella-shaped unit 50 to achieve a configuration that can ensure a proper installation state regardless of installation environments even if the grommet 1 is applied to the different installation environments as described above. Hereinafter, the configuration of the grommet 1 will be described in detail with reference to each drawing.

In the following description, among a first direction, a second direction, and a third direction that intersect with each other, the first direction is referred to as an "axial direction X", the second direction is referred to as a "width direction Y", and the third direction is referred to as a "height direction Z". The axial direction X, the width direction Y, and the height direction Z are typically orthogonal to each other. Here, the axial direction X corresponds to the plate thickness direction of the attachment panel 100 described above, and corresponds to the insertion direction of the wiring members W and the grommet 1 with respect to the through hole 101. In other words, the axial direction X is a direction along the extension direction of the wiring members W inserted through the grommet 1. The width direction Y and the height direction Z correspond to the extension direction of the attachment panel 100. The width direction Y and the height direction Z also correspond to the radial direction of the grommet 1. Here, for convenience in simple explanation, the wiring members W will be described as being linearly wired along the axial direction X; however, the present invention is not limited thereto, and in a state in which the grommet 1 is attached to the attachment panel 100, the axial direction X may be a bent direction, and the grommet 1 and the wiring members W may be partially bent and provided. Furthermore, the directions used in the following description will be described as directions in a state in which the grommet 1 is assembled to the attachment panel 100, unless otherwise specified.

Specifically, as illustrated in FIG. 1 and FIG. 2, the grommet 1 of the present embodiment is a seal member through which the wiring members W are inserted along the axial direction X, and capable of stopping water from entering between the grommet 1 and the through hole 101 of the attachment panel 100. The grommet 1 includes a body 10, a first tubular unit 20, a second tubular unit 30, a third tubular unit 40, and the umbrella-shaped unit 50, which are integrally formed as an elastic body. Furthermore, in the grommet 1, a first space part S1, a second space part S2, an insertion space part S3, a first annular space part S4, a second annular space part S5, and the like are formed by the body 10, the first tubular unit 20, the second tubular unit 30, the third tubular unit 40, and the umbrella-shaped unit 50. The grommet 1 is formed of an insulating elastic resin material (for example, ethylene-propylene-diene rubber (EPDM) and the like) having low rigidity and high flexibility, such as rubber and thermoplastic elastomer.

The body 10 is a part that is fitted into the through hole 101 along the axial direction X to stop water from entering the through hole 101, and through which the wiring members W are inserted along the axial direction X. The body 10 includes a water stop section 11, a first annular wall section 12, a second annular wall section 13, and a third annular wall section 14. The body 10 is formed in an annular shape around a center axis C as a whole.

The water stop section 11 is formed in an annular shape around the center axis C, and is fitted into the through hole 101 along the axial direction X to stop water in the through hole 101. The water stop section 11 is formed in a shape corresponding to the shape of the through hole 101. Here, the through hole 101 is formed in a substantially circular shape around the center axis C. Accordingly, the water stop section 11 is formed in a substantially annular shape around the center axis C.

The water stop section 11 includes a fitting groove 11a formed in an outer peripheral surface along a circumferential direction (direction around the center axis C) (refer also to FIG. 3 and other drawings). The fitting groove 11a is continuously formed in the circumferential direction in the outer peripheral surface of the water stop section 11 as an annular groove centered on the center axis C. Here, the water stop section 11 is formed so that an outer diameter on one side in the axial direction X (the third annular wall section 14 side to be described below) is relatively larger than an outer dimeter on the other side (the second annular wall section 13 side to be described below) with the fitting groove 11a interposed between the one side and the other side.

Furthermore, the water stop section 11 includes lip sections 11b formed in the fitting groove 11a (refer to FIG. 3 and other drawings). The lip sections 11b are pleated portions formed along the fitting groove 11a. The lip sections 11b are formed in a substantially annular shape around the center axis C along a side surface and a bottom surface of the fitting groove 11a. In a state in which an edge portion (rising portion 102) of the through hole 101 is fitted into the fitting groove 11a, the lip sections 11b come into contact with the surface of the edge portion and stop water from entering between the surface and the lip sections 11b. The lip sections 11b are configured to be brought into close contact with the surface of the edge portion (rising portion 102) forming the through hole 101 by elastic deformation, and to seal the entire circumferential edge of the through hole 101.

The first annular wall section 12, the second annular wall section 13, and the third annular wall section 14 are each formed in a substantially annular plate shape around the center axis C. The first annular wall section 12, the second annular wall section 13, and the third annular wall section 14 are located inside the water stop section 11 in the radial direction (orthogonal direction orthogonal to the center axis C and direction along the width direction Y and the height direction Z), and close the inside of the water stop section 11. The first annular wall section 12, the second annular wall section 13, and the third annular wall section 14 face each other with a space along the axial direction X, and are integrated by the water stop section 11 at the outer peripheral ends thereof. Here, the outer peripheral ends are ends of the first annular wall section 12, the second annular wall section 13, and the third annular wall section 14 located radially outward. The water stop section 11 described above connects and integrates the outer peripheral ends of the first annular wall section 12, the second annular wall section 13, and the third annular wall section 14 located radially outward.

In the body 10, the second annular wall section 13, the first annular wall section 12, and the third annular wall section 14 are located side by side in this order from one side to the other side along the axial direction X. The first annular wall section 12 extends along the radial direction across the water stop section 11 and the first tubular unit 20 to be described below, and closes between the water stop section 11 and the first tubular unit 20. The second annular wall section 13 extends along the radial direction across the water stop section 11 and the second tubular unit 30 to be described below, and closes between the water stop section 11 and the second tubular unit 30. The second annular wall section 13 is formed in a hollow dome shape that bulges to one side along the axial direction X with respect to the first annular wall section 12, and forms the first space part S1 as a hollow part between the second annular wall section 13 and the first annular wall section 12. The third annular wall section 14 extends along the radial direction across the water stop section 11 and the third tubular unit 40 to be described below, and closes between the water stop section 11 and the third tubular unit 40. The third annular wall section 14 is formed in a hollow dome shape that bulges to a side opposite to the second annular wall section 13 side along the axial direction X with respect to the first annular wall section 12, and forms the second space part S2 as a hollow part between the third annular wall section 14 and the first annular wall section 12.

In the body 10, the aforementioned first space part S1 and the aforementioned second space part S2 serve as sound insulation space parts for securing sound insulation performance of the grommet 1. Furthermore, in the body 10, the aforementioned first annular wall section 12 serves as a sound insulation wall part for securing sound insulation performance of the grommet 1.

The first tubular unit 20, the second tubular unit 30, and the third tubular unit 40 are parts that are formed in a tubular shape integrally with the body 10, and through which the wiring members W are inserted along the axial direction X. The first tubular unit 20, the second tubular unit 30, and the third tubular unit 40 are each located radially inside the body 10. The first tubular unit 20, the second tubular unit 30, and the third tubular unit 40 are each formed in a substantially cylindrical shape around the center axis C, and extend along the axial direction X.

Furthermore, in the first tubular unit 20, one end in the axial direction X is opened and the other end is connected to a radially inner end of the first annular wall section 12. The second tubular unit 30 is formed in a substantially cylindrical shape coaxial with the first tubular unit 20 and has an inner diameter larger than an outer diameter of the first tubular unit 20. The second tubular unit 30 covers the outside of the first tubular unit 20 with a gap between the second tubular unit 30 and the first tubular unit 20 in the radial direction. In the second tubular unit 30, one end in the axial direction X is opened and the other end is connected to a radially inner end of the second annular wall section 13. The third tubular unit 40 is provided at a position at which the third tubular unit is coaxial with the first tubular unit 20 and faces the first tubular unit 20 along the axial direction X. Here, the third tubular unit 40 has a middle portion formed in a bellows shape. In the third tubular unit 40, one end in the axial direction X is opened and the other end is connected to a radially inner end of the third annular wall section 14.

In the grommet 1, the inner space parts of the body 10, the first tubular unit 20, and the third tubular unit 40 configured as described above serve as the insertion space part S3. The insertion space part S3 is a space part through which the wiring members W are inserted, and is continuous along the axial direction X across the inner space part of the first tubular unit 20, the second space part S2 of the body 10, and the inner space part of the third tubular unit 40. In the grommet 1, the wiring members W are inserted along the axial direction X through the insertion space part S3 formed by connecting the first tubular unit 20, the body 10, and the third tubular unit 40.

The umbrella-shaped unit 50 is a part that extends outward from the body 10 along the radial direction, is formed in an annular shape around the body 10, and abuts an abutting target surface 104 provided on the attachment panel 100 in a state in which the body 10 is fitted into the through hole 101. The umbrella-shaped unit 50 serves as a sound insulation wall part for securing sound insulation performance of the grommet 1.

Specifically, as illustrated in FIG. 1, FIG. 2, FIG. 3, FIG. 4, and FIG. 5, the umbrella-shaped unit 50 includes an annular wall section 51, a first lip section 52, a second lip section 53, and the stress concentration section 54. The umbrella-shaped unit 50 is formed in an annular shape around the center axis C as a whole.

The annular wall section 51 is a part that extends from the body 10 to a side opposite to the center axis C, that is, extends radially outward, and is formed in an annular shape around the body 10. The annular wall section 51 extends to protrude outward along the radial direction from an end of the water stop section 11 of the body 10 on a side of the third annular wall section 14, the end having a relatively large outer diameter. The annular wall section 51 is formed in a substantially annular plate shape around the center axis C along the outer shape of the water stop section 11 formed in a substantially annular shape.

More specifically, the annular wall section 51 includes a first part 51A and a second part 51B. The first part 51A is located on a proximal end side of the annular wall section 51 on an inner side in the radial direction. In the first part 51A, an inner peripheral end located on the inner side in the radial direction is connected to the water stop section 11 and is supported by the water stop section 11. The first part 51A is formed to be inclined with respect to the radial direction. The first part 51A is inclined in a positional relationship toward the second annular wall section 13 side along the axial direction X as the first part 51A extends toward an outer side in the radial direction. The second part 51B is located on a distal end side of the annular wall section 51 on the outer side in the radial direction. The second part 51B extends from the first part 51A so as to protrude outward along the radial direction. The second part 51B extends along a direction that intersects the extension direction of the first part 51A. The annular wall section 51 is formed in a bent shape at a connecting portion between the first part 51A and the second part 51B.

The first lip section 52 and the second lip section 53 are parts that are formed to protrude from the annular wall section 51 toward the attachment panel 100 along the axial direction X, and abut the abutting target surface 104 (refer to FIG. 2 and other drawings) provided on the attachment panel 100 in a state in which the body 10 is fitted into the through hole 101. The first lip section 52 is formed in an annular shape with a gap on a side opposite to the center axis C side, that is, on the outer side in the radial direction of the body 10. The second lip section 53 is a part formed in an annular shape with a gap on a side opposite to the center axis C side, that is, on the outer side in the radial direction of the first lip section 52.

More specifically, both the first lip section 52 and the second lip section 53 are formed in a substantially annular shape around the center axis C, and are located with a gap between each other along the radial direction. The first lip section 52 is located relatively radially inside the annular wall section 51. The first lip section 52 is located on the outside of the body 10 in the radial direction with a gap between the first lip section 52 and the body 10. The second lip section 53 is located relatively radially outside the annular wall section 51. The second lip section 53 is located on the outside of the first lip section 52 in the radial direction with a gap between the second lip section 53 and the first lip section 52. Here, the first lip section 52 is provided at the connecting portion between the first part 51A and the second part 51B of the annular wall section 51. On the other hand, the second lip section 53 is provided at a distal end portion of the second part 51B of the annular wall section 51. With such a configuration, in the umbrella-shaped unit 50, the first annular space part S4 and the second annular space part S5 are formed by the first lip section 52 and the second lip section 53. The first annular space part S4 is an annular space part formed between the body 10 and the first lip section 52. The second annular space part S5 is an annular space part formed between the first lip section 52 and the second lip section 53.

As described above, both the first lip section 52 and the second lip section 53 are pleated portions formed to protrude along the axial direction X from the annular wall section 51 to a side where the attachment panel 100 is located, in this case, to the second annular wall section 13 side. Both the first lip section 52 and the second lip section 53 are configured to abut while elastically deforming, and be brought into close contact with, the abutting target surface 104 provided on the attachment panel 100 so as to provide sealing around the center axis C in a substantially annular shape in a state in which the body 10 is fitted into the through hole 101.

Figure 5:
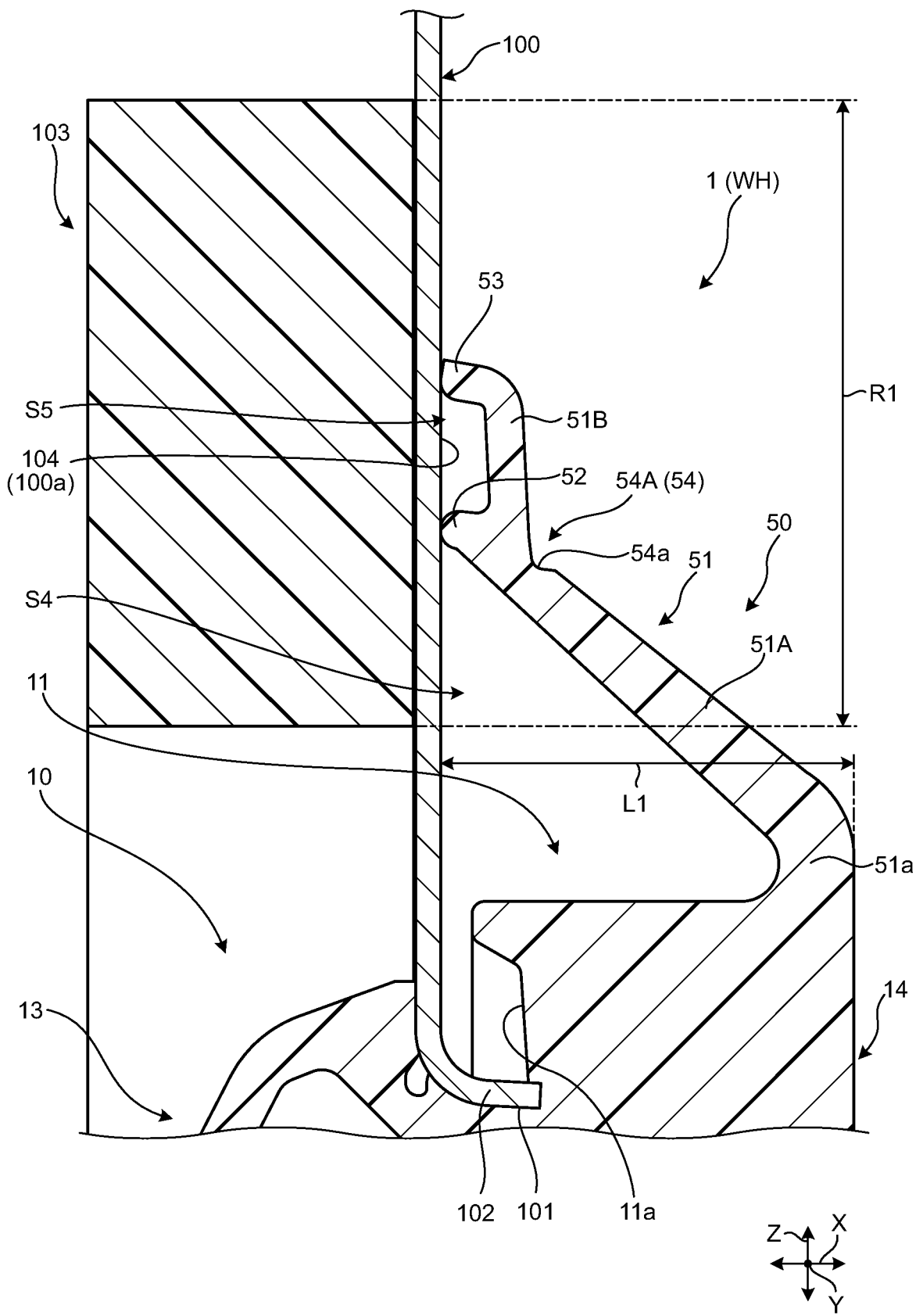
FIG. 5 is a partial sectional view illustrating an operation of the grommet according to the embodiment.

In the umbrella-shaped unit 50, in a state in which the body 10 is fitted into the through hole 101 and the first lip section 52 and the second lip section 53 abut the abutting target surface 104, the first annular space part S4 and the second annular space part S5 serve as space parts closed by the abutting target surface 104 and the like (refer to FIG. 5 and other drawings). Typically, the first annular space part S4 serves as a space part surrounded and closed by the body 10, the first lip section 52, the first part 51A of the annular wall section 51, the abutting target surface 104, and the like. The second annular space part S5 serves as a space part surrounded and closed by the first lip section 52, the second lip section 53, the second part 51B of the annular wall section 51, the abutting target surface 104, and the like. In the umbrella-shaped unit 50, the aforementioned first annular space part S4 and the aforementioned second annular space part S5 serve as sound insulation space parts for securing sound insulation performance of the grommet 1.

The stress concentration section 54 is a part that can be bent due to concentrated stress in a state in which the body 10 is fitted into the through hole 101 and the first lip section 52 and the second lip section 53 abut the abutting target surface 104. In the annular wall section 51, the stress concentration section 54 is provided in an annular shape on the center axis C side with respect to the first lip section 52, that is, on the inner side in the radial direction, and is located within an installation region R1 (refer to FIG. 4 and FIG. 5) of the insulator 103 when viewed along the axial direction X. Here, the installation region R1 of the insulator 103 is a region where the insulator 103 is set, and is a region assumed in advance in terms of design. The installation region R1 of the insulator 103 is typically set at a position set back in the radial direction with respect to the edge of the through hole 101. The first lip section 52, the second lip section 53, and the stress concentration section 54 of the present embodiment are all provided in an annular shape in the annular wall section 51 so as to be located within the installation region R1 when viewed along the axial direction X.

Figure 4:
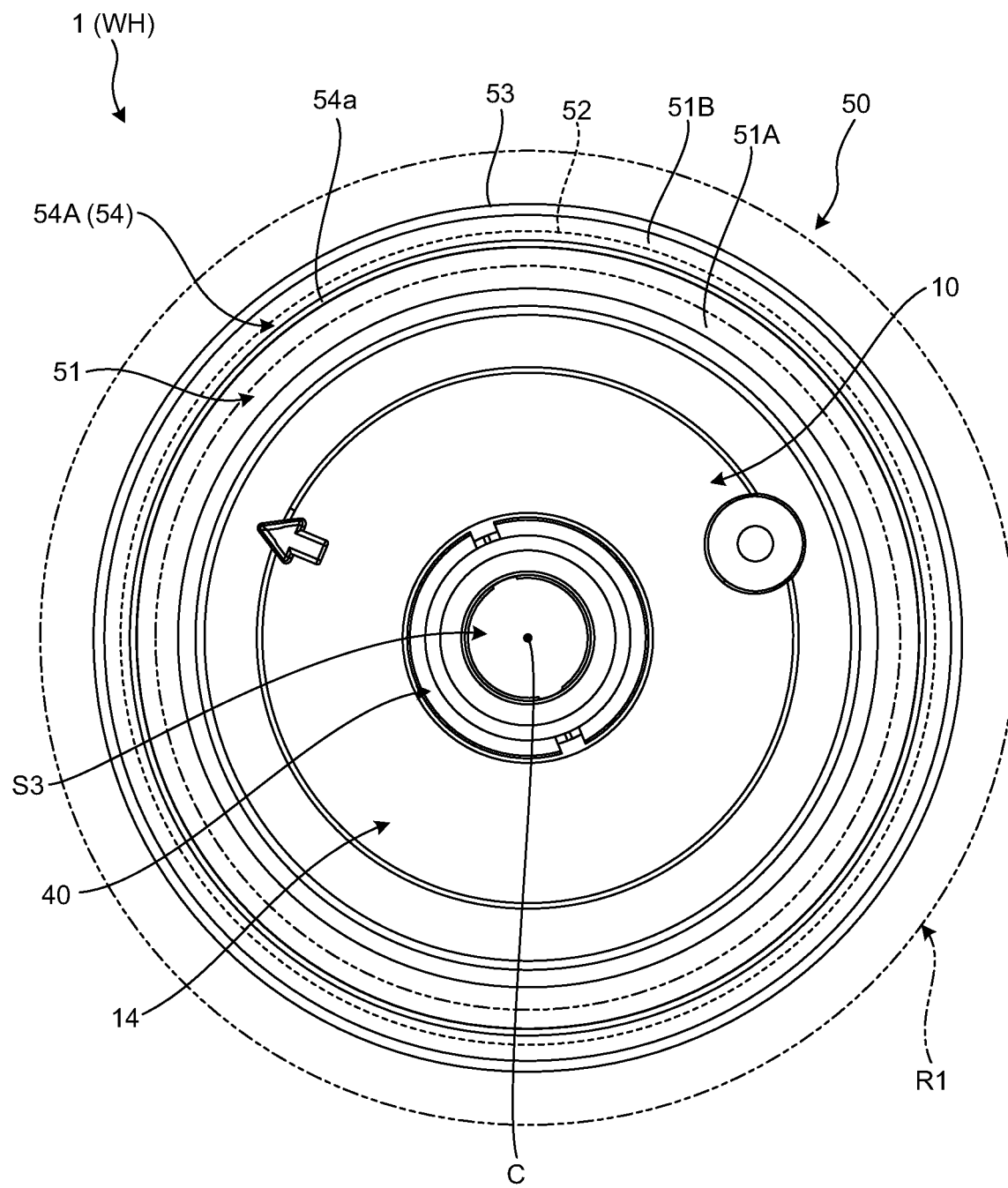
FIG. 4 is a front view of the grommet according to the embodiment.

The stress concentration section 54 is formed in a substantially annular shape around the center axis C (refer to FIG. 4 and other drawings). Here, the stress concentration section 54 is formed in a substantially annular shape at an inner edge of (radial inner edge) of the connecting portion between the first part 51A and the second part 51B of the annular wall section 51 along the connecting portion. More specifically, the stress concentration section 54 of the present embodiment is located adjacent to the first lip section 52 and on the center axis C side of the first lip section 52, that is, on the inner side in the radial direction. Here, when the stress concentration section 54 is located radially inside with respect to the first lip section 52 and is adjacent to the first lip section 52, it typically means that the center of the stress concentration section 54 is located radially inside with respect to the center of the first lip section 52, and is closest to the first lip section 52 side within a manufacturable range. That is, the position adjacent to the first lip section 52 and radially inside with respect to the first lip section 52 typically corresponds to a position where the center of the stress concentration section 54 is located radially inside with respect to the center of the first lip section 52 and is closest to the first lip section 52 side within the manufacturable range.

The stress concentration section 54 of the present embodiment includes a thin part 54A formed to have a thickness T1 (refer to FIG. 3) thinner than those of other portions in the annular wall section 51. The annular wall section 51 is provided with a notch 54a on a surface opposite to the protruding sides of the first lip section 52 and the second lip section 53 and at the connecting portion between the first part 51A and the second part 51B, so that the thin part 54A is formed. The notch 54a is a concave recess or a cutout, and is formed in a substantially annular shape at the inner edge of the connecting portion between the first part 51A and the second part 51B along the connecting portion. The stress concentration section 54 includes the thin part 54A formed by the notch 54a, and serves as an active bending point forming part like a hinge. With such a configuration, the stress concentration section 54 can be configured to receive concentrated stress and easily bend before other portions do when a force acts on the annular wall section 51 along the axial direction X in a state in which the body 10 is fitted into the through hole 101 and the first lip section 52 and the second lip section 53 abut the abutting target surface 104.

The grommet 1 configured as described above is mounted on the wiring members W by inserting the wiring members W through the insertion space part S3, and then is inserted through the through hole 101 from the side of the first tubular unit 20 and the second tubular unit 30 together with ends of the wiring members W. Then, the water stop section 11 of the body 10 is fitted into the through hole 101 in such a manner that the edge portion of the through hole 101 is fitted into the fitting groove 11a from a side of the second annular wall section 13 having a relatively small outer diameter, so that the grommet 1 is assembled to the attachment panel 100. In such a state, in the grommet 1, the lip section 11b is brought into close contact with the surface of the edge portion of the through hole 101 while being elastically deformed and seals the entire circumferential edge of the through hole 101. As a result, the grommet 1 can secure proper water stop performance. Note that in the grommet 1, water may be stopped from entering openings of the second tubular unit 30 and the third tubular unit 40 by winding a winding tape and the like around the wiring members W inserted into the insertion space part S3 and the second tubular unit 30, and the third tubular unit 40 and the wiring members W.

Furthermore, in the grommet 1, in a state in which the body 10 is fitted into the through hole 101, the first annular wall section 12 that closes between the water stop section 11 and the first tubular unit 20 serves as a sound insulation wall part, and both the first space part S1 and the second space part S2 forming air layers serve as sound insulation space parts. With such a configuration, the grommet 1 can attenuate and insulate sound, which otherwise propagates through the through hole 101, by the first annular wall section 12, the first space part S1, the second space part S2, and the like, thereby improving sound insulation performance.

Moreover, in the grommet 1, in a state in which the body 10 is fitted into the through hole 101, the first lip section 52 and the second lip section 53 of the umbrella-shaped unit 50 abut while elastically deforming, and are brought into close contact with, the abutting target surface 104 provided on the attachment panel 100 so as to provide sealing around the center axis C in a substantially annular shape. As a result, the grommet 1 can further improve water stop performance.

Furthermore, in the grommet 1, the first lip section 52 and the second lip section 53 are brought into close contact with the abutting target surface 104 as described above, so that the first annular space part S4 and the second annular space part S5 are formed as a closed space part between the grommet 1 and the attachment panel 100. Furthermore, in the grommet 1, the annular wall section 51 of the umbrella-shaped unit 50 serves as a sound insulation wall part and both the first annular space part S4 and the second annular space part S5 forming air layers serve as sound insulation space parts. With such a configuration, the grommet 1 can attenuate and insulate sound, which otherwise propagates through the vicinity of the through hole 101 in the attachment panel 100, by the annular wall section 51, the first annular space part S4, the second annular space part S5, and the like, thereby further improving sound insulation performance.

At this time, as illustrated in FIG. 5, FIG. 6, FIG. 7, and FIG. 8, even if the grommet 1 is applied to different installation environments, the stress concentration section 54 provided in the umbrella-shaped unit 50 can secure a proper installation state regardless of the installation environments. That is, in the grommet 1, in a state in which the body 10 is fitted into the through hole 101 and the first lip section 52 and the second lip section 53 abut the abutting target surface 104, when a force acts on the annular wall section 51 along the axial direction X, stress is concentrated on the stress concentration section 54, so that the stress concentration section 54 is actively bent. With such a configuration, in the grommet 1, even if a length L1 from a proximal end 51a to a distal end of the annular wall section 51 along the axial direction X differs depending on installation environments, the stress concentration section 54 is bent according to the length L1, so that it is possible to absorb a change in the length L1 by the stress concentration section 54. For example, in the grommet 1, even if the length L1 is relatively short, the stress concentration section 54 is bent according to the length L1, so that it is possible to prevent the entire umbrella-shaped unit 50 from being deformed in such a manner that the second lip section 53 rises with the first lip section 52 as a fulcrum. As a result, in the grommet 1, even if the length L1 differs depending on installation environments, the stress concentration section 54 is bent according to the length L1, so that the first lip section 52 and the second lip section 53 can be ensured to follow the abutting target surface 104 and brought into close contact with the abutting target surface 104. With this configuration, the grommet 1 can secure a state in which the first lip section 52, the second lip section 53, and the abutting target surface 104 are in proper contact with each other regardless of installation environments.

For example, FIG. 5 illustrates an installation environment in which the insulator 103 is provided on a side opposite to a side of the attachment panel 100 on which the rising portion 102 protrudes and the grommet 1 is provided from the side on which the rising portion 102 protrudes (the same also applies to FIG. 1 and FIG. 2 described above). In such a case, the abutting target surface 104 abutted by the first lip section 52 and the second lip section 53 is formed by a surface 100a of the attachment panel 100 on the side where the rising portion 102 protrudes. In such a case, in the grommet 1, in a state in which the body 10 is fitted into the through hole 101, the first lip section 52 and the second lip section 53 of the umbrella-shaped unit 50 abut, and are brought into close contact with, the surface 100a of the attachment panel 100 forming the abutting target surface 104. With this configuration, in the grommet 1, the first annular space part S4 and the second annular space part S5 are formed by the first lip section 52 and the second lip section 53 as closed space parts between the grommet 1 and the surface 100a of the attachment panel 100 forming the abutting target surface 104.

Figure 6:
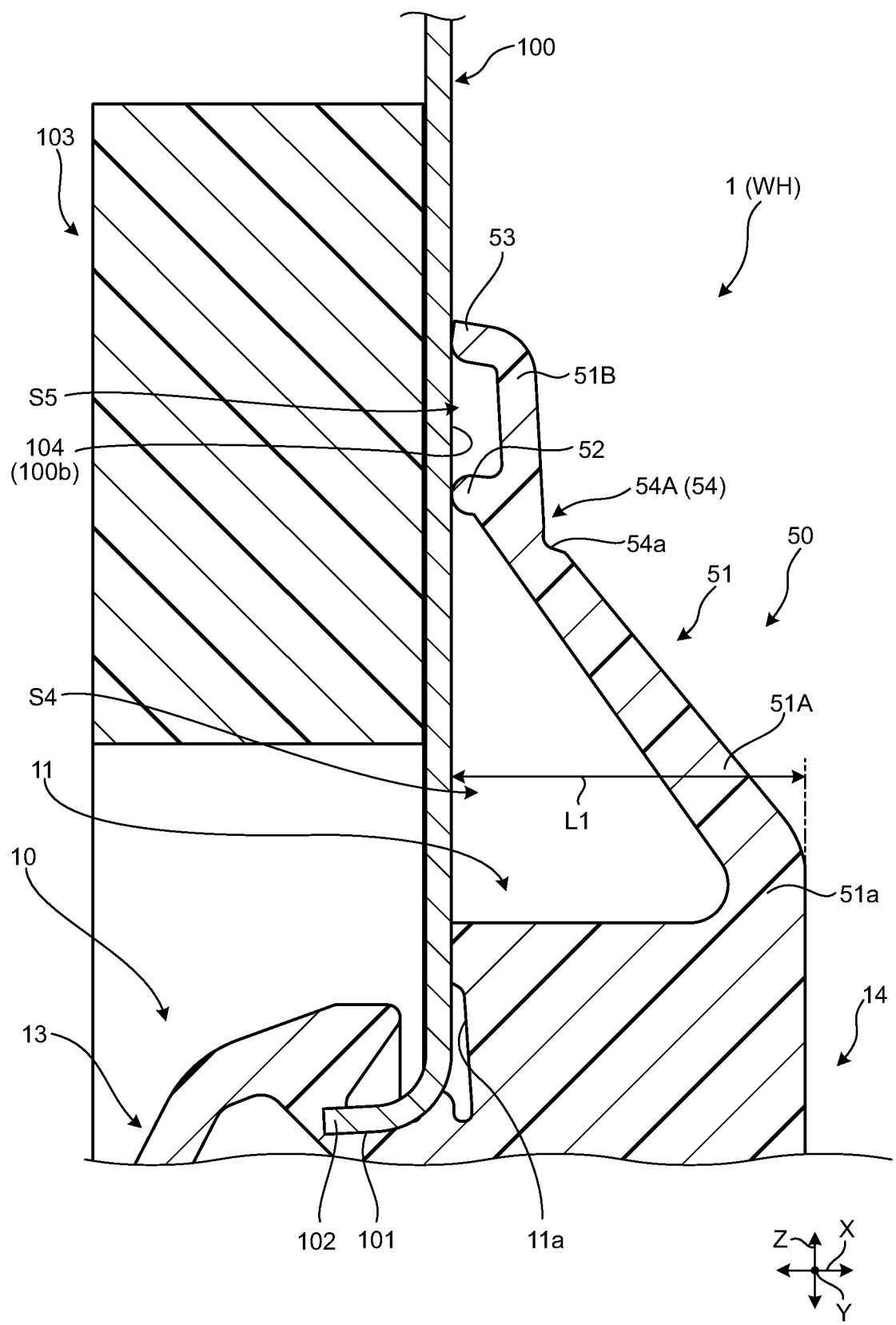
FIG. 6 is a partial sectional view illustrating an operation of the grommet according to the embodiment.

FIG. 6 illustrates an installation environment in which the insulator 103 is provided on a side of the attachment panel 100 on which the rising portion 102 protrudes and the grommet 1 is provided from a side opposite to the side where the rising portion 102 protrudes. In such a case, the abutting target surface 104 abutted by the first lip section 52 and the second lip section 53 is formed by a surface 100b of the attachment panel 100 on a side opposite to the side where the rising portion 102 protrudes. In such a case, compared to the case of the installation environment illustrated in FIG. 5, the length L1 tends to be relatively short as the rising portion 102 faces the side opposite to the umbrella-shaped unit 50 side in the axial direction X. On the other hand, in the grommet 1, in a state in which the body 10 is fitted into the through hole 101 and the first lip section 52 and the second lip section 53 of the umbrella-shaped unit 50 abut the surface 100b of the attachment panel 100, which forms the abutting target surface 104, the stress concentration section 54 is bent according to the length L1.

As a result, in the grommet 1, even in the installation environment illustrated in FIG. 6, the first lip section 52 and the second lip section 53 can be ensured to follow the surface 100b forming the abutting target surface 104 and brought into close contact with the surface 100b. With this configuration, the first annular space part S4 and the second annular space part S5 are formed by the first lip section 52 and the second lip section 53 as closed space parts between the grommet 1 and the surface 100b of the attachment panel 100 forming the abutting target surface 104.

Figure 7:
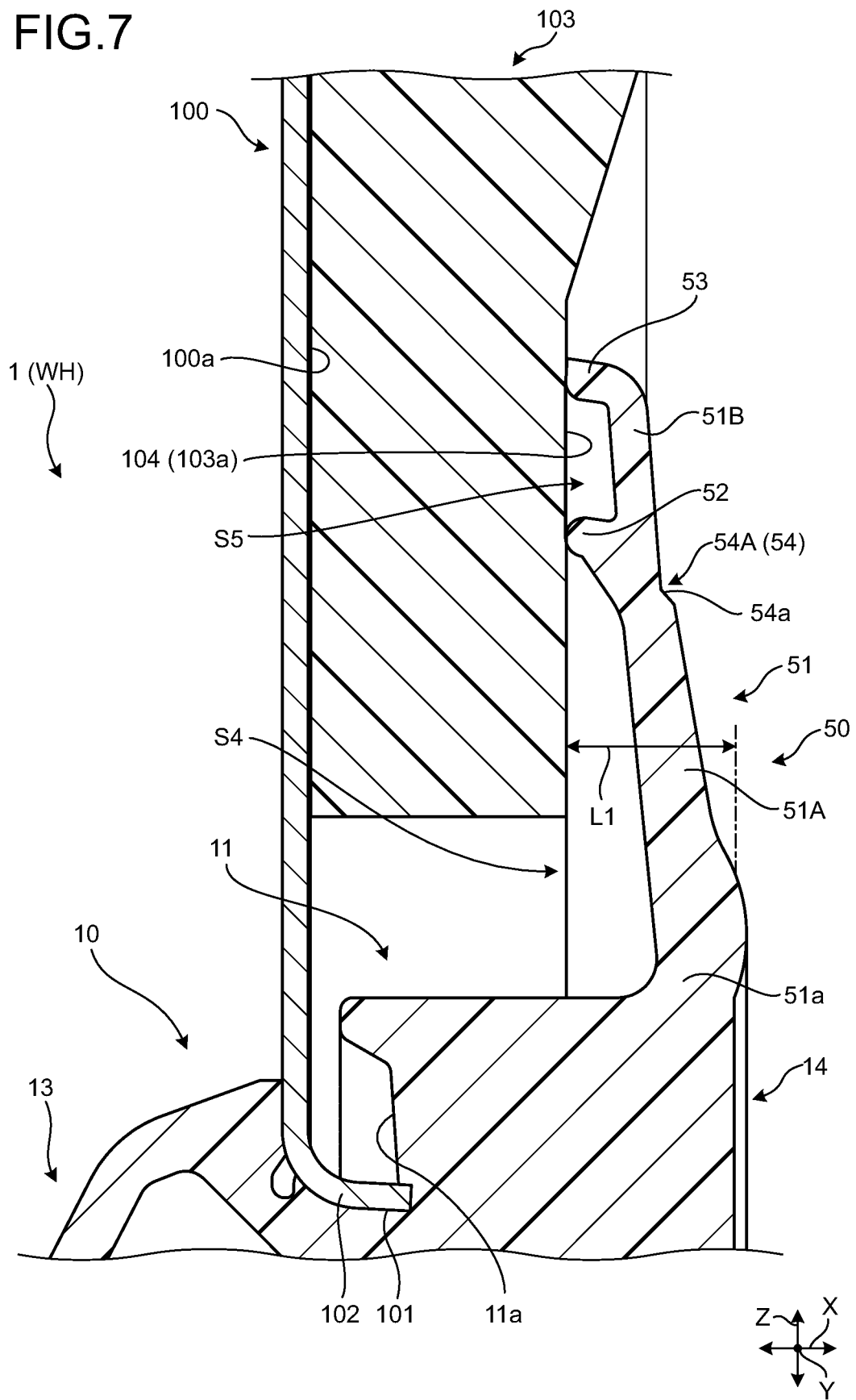
FIG. 7 is a partial sectional view illustrating an operation of the grommet according to the embodiment.

FIG. 7 illustrates an installation environment in which the insulator 103 is provided on a side of the attachment panel 100 on which the rising portion 102 protrudes and the grommet 1 is provided from the side on which the rising portion 102 protrudes. In such a case, the abutting target surface 104 abutted by the first lip section 52 and the second lip section 53 is formed by a surface 103a of the insulator 103 provided on the surface 100a of the attachment panel 100 on the side where the rising portion 102 protrudes. In such a case, compared to the case of the installation environment illustrated in FIG. 5, the length L1 tends to be relatively short as the first lip section 52 and the second lip section 53 ride on the insulator 103. On the other hand, in the grommet 1, in a state in which the body 10 is fitted into the through hole 101 and the first lip section 52 and the second lip section 53 of the umbrella-shaped unit 50 abut the surface 103a of the insulator 103, which forms the abutting target surface 104, the stress concentration section 54 is bent according to the length L1. In such a case, in the grommet 1, even if the length L1 is relatively short by the thickness of the insulator 103 as described above, the stress concentration section 54 is bent according to the length L1, so that it is possible to prevent the entire umbrella-shaped unit 50 from being deformed in such a manner that the second lip section 53 rises with the first lip section 52 as a fulcrum.

At this time, as described above, the stress concentration section 54 is located within the installation region R1 of the insulator 103 together with the first lip section 52 and the second lip section 53 when viewed along the axial direction X. Therefore, the umbrella-shaped unit 50 can form a bending point made by the stress concentration section 54 within the installation region R1 in the annular wall section 51. With such a configuration, the grommet 1 can prevent the bending point made by the stress concentration section 54 from deviating from the surface 103a of the insulator 103 forming the abutting target surface 104, thereby suppressing large lifting up of a part of the umbrella-shaped unit 50 including the first lip section 52 and the second lip section 53 and separation of the part from the surface 103a.

As a result, in the grommet 1, even in the installation environment illustrated in FIG. 7, the first lip section 52 and the second lip section 53 can be ensured to follow the surface 103a forming the abutting target surface 104 and brought into close contact with the surface 103a. With this configuration, in the grommet 1, the first annular space part S4 and the second annular space part S5 are formed by the first lip section 52 and the second lip section 53 as closed space parts between the grommet 1 and the surface 103a of the insulator 103 forming the abutting target surface 104, and the surface 100a of the attachment panel 100.

Figure 8:
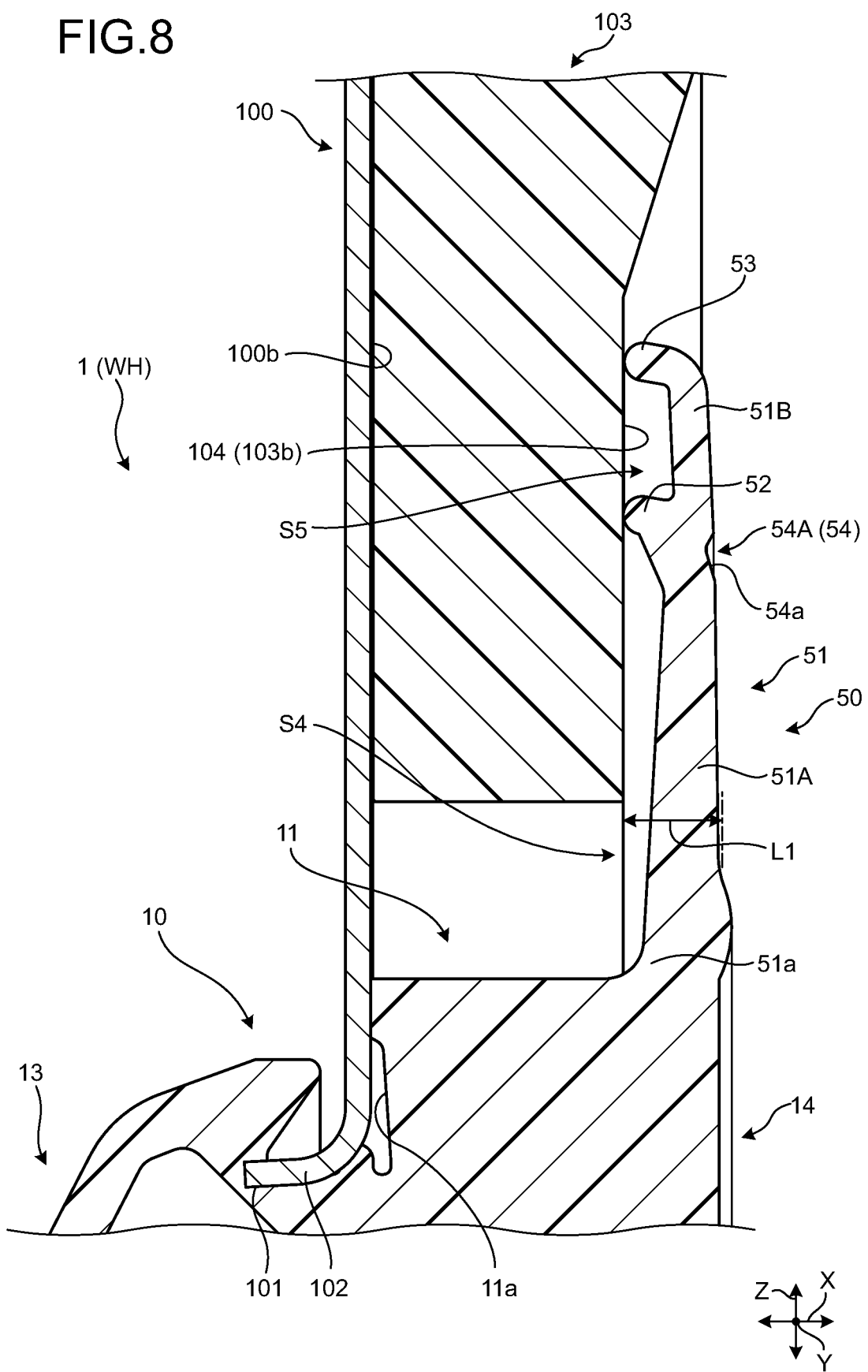
FIG. 8 is a partial sectional view illustrating an operation of the grommet according to the embodiment.

FIG. 8 illustrates an installation environment in which the insulator 103 is provided on a side of the attachment panel 100 opposite to the side where the rising portion 102 protrudes and the grommet 1 is provided from a side opposite to the side where the rising portion 102 protrudes. In such a case, the abutting target surface 104 abutted by the first lip section 52 and the second lip section 53 is formed by a surface 103b of the insulator 103 provided on the surface 100b of the attachment panel 100 opposite to the side where the rising portion 102 protrudes. In such a case, compared to the case of the installation environment illustrated in FIG. 7, the length L1 tends to be relatively shorter as the rising portion 102 faces the side opposite to the umbrella-shaped unit 50 side in the axial direction X. Even in such a case, as in the case of FIG. 7, in the grommet 1, in a state in which the body 10 is fitted into the through hole 101 and the first lip section 52 and the second lip section 53 of the umbrella-shaped unit 50 abut the surface 103b of the insulator 103, which forms the abutting target surface 104, the stress concentration section 54 is bent according to the length L1.

As a result, in the grommet 1, even in the installation environment illustrated in FIG. 8, the first lip section 52 and the second lip section 53 can be ensured to follow the surface 103b forming the abutting target surface 104 and brought into close contact with the surface 103b. With this configuration, in the grommet 1, the first annular space part S4 and the second annular space part S5 are formed by the first lip section 52 and the second lip section 53 as closed space parts between the grommet 1 and the surface 103b of the insulator 103 forming the abutting target surface 104, and the surface 100b of the attachment panel 100.

With the grommet 1 and the wire harness WH described above, the body 10 is fitted into the through hole 101 formed in the attachment panel 100, so that water is stopped from entering the through hole 101 and the wiring members W are inserted through the through hole 101. With such a configuration, the grommet 1 can properly secure water stop performance as described above.

Furthermore, with such a configuration, in the grommet 1, in a state in which the body 10 is fitted into the through hole 101, the first lip section 52 and the second lip section 53 provided in the annular wall section 51 of the umbrella-shaped unit 50 abut the abutting target surface 104 provided on the attachment panel 100. With such a configuration, the grommet 1 can properly secure sound insulation performance as described above.

At this time, in the grommet 1, in a state in which the body 10 is fitted into the through hole 101 and the first lip section 52 and the second lip section 53 abut the abutting target surface 104, stress is concentrated on the stress concentration section 54 provided at a predetermined position of the annular wall section 51, so that the annular wall section 51 can be bent at the stress concentration section 54. With such a configuration, even if installation environments are different due to a difference in the rising direction of the rising portion 102 of the attachment panel 100, a difference in the installation surface of the insulator 103, and the like, the grommet 1 can secure a state in which the first lip section 52, the second lip section 53, and the abutting target surface 104 are in proper contact with each other. As a result, the grommet and the wire harness can secure a proper installation state in which required water stop performance and sound insulation performance can be exhibited.

In the grommet 1 and the wire harness WH described above, the stress concentration section 54 includes the thin part 54A formed to have a thickness T1 thinner than those of other portions in the annular wall section 51. With this configuration, the grommet 1 and the wire harness WH can be formed in a shape that can be easily removed from a die when the stress concentration section 54 is formed, so that manufacturing efficiency is improved and a proper installation state can be secured as described above.

Furthermore, in the grommet 1 and the wire harness WH described above, the stress concentration section 54 is located radially inside with respect to the first lip section 52 and is adjacent to the first lip section 52. With such a configuration, the grommet 1 can be positioned so that the bending point made by the stress concentration section 54 is adjacent to the first lip section 52, so that the first lip section 52 and the second lip section 53 can easily follow the abutting target surface 104. As a result, the grommet 1 and the wire harness WH can easily maintain a state in which the first lip section 52, the second lip section 53, and the abutting target surface 104 are in proper contact with each other, so that a more proper installation state can be secured.

Note that a grommet and a wire harness according to the embodiment of the present invention described above are not limited to the aforementioned embodiment, and various modifications can be made within the scope of the claims.

In the above description, the through hole 101 is formed in a substantially circular shape around the center axis C and thus the water stop section 11 is formed in a substantially annular shape around the center axis C; however, the present invention is not limited thereto. For example, the through hole 101 may be formed in an elliptical shape and thus the water stop section 11 and the umbrella-shaped unit 50 may also be formed in an elliptical shape.

The stress concentration section 54 described above has been described as being located radially inside with respect to the first lip section 52 and adjacent to the first lip section 52; however, the present invention is not limited thereto. It is sufficient if the stress concentration section 54 is provided, in the annular wall section 51, radially inside with respect to the first lip section 52, and is located within the installation region R1 (refer to FIG. 4 and FIG. 5) when viewed along the axial direction X.

Figure 11:
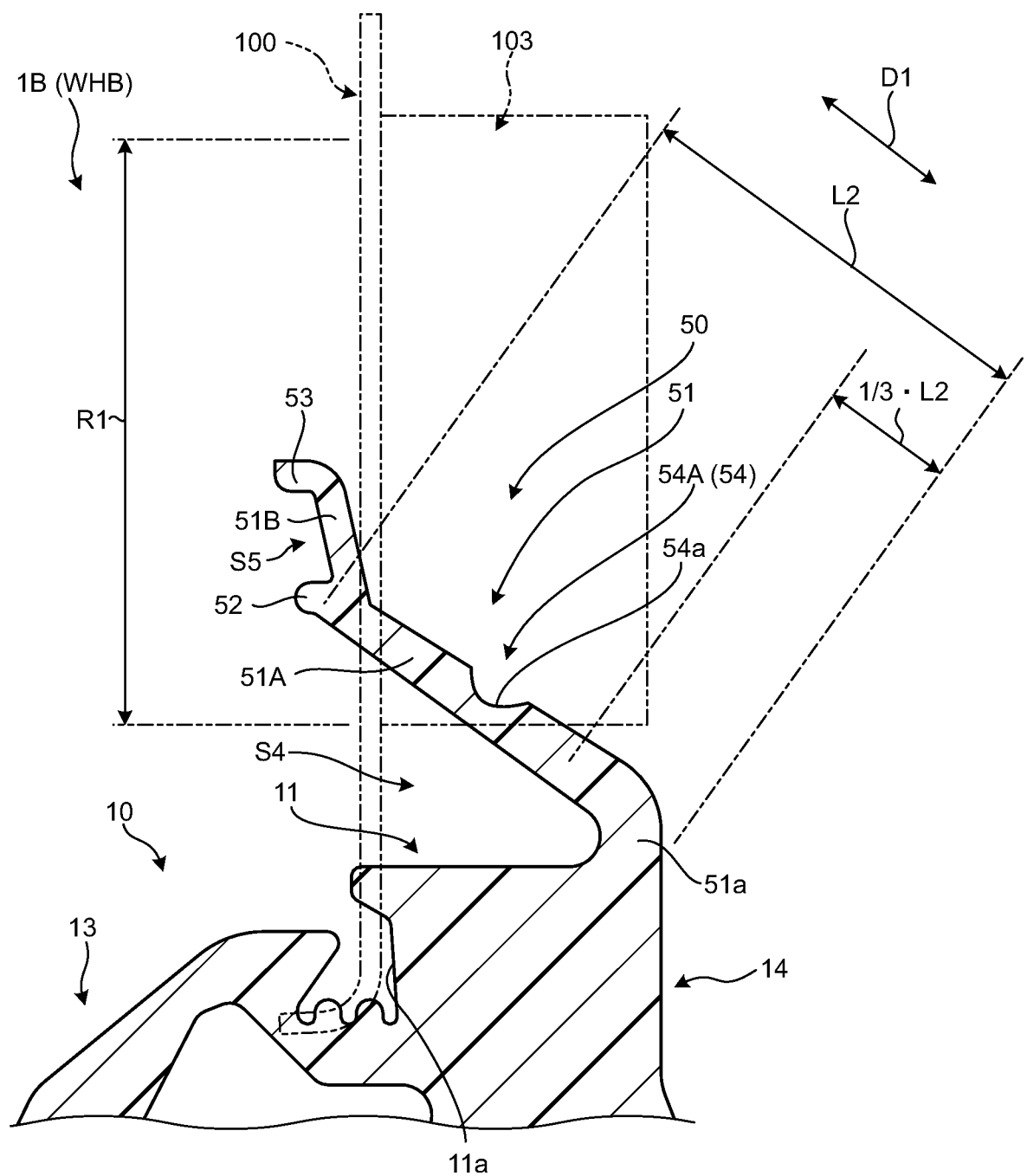
FIG. 11 is a partial sectional view including a stress concentration section of a grommet according to a modification.
Figure 12:
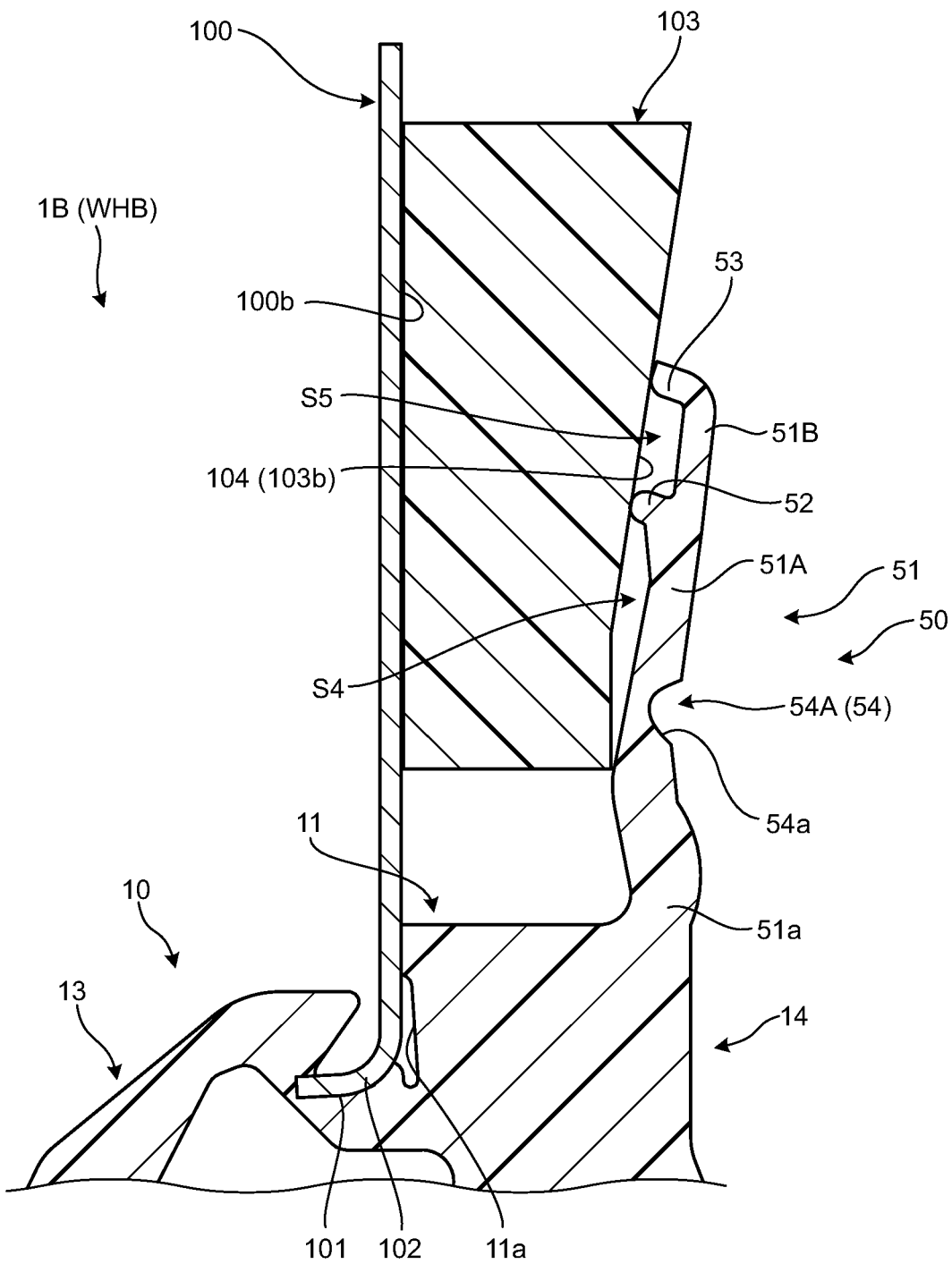
FIG. 12 is a partial sectional view including a stress concentration section of the grommet according to the modification.

A grommet 1A included in a wire harness WHA according to a modification illustrated in FIG. 9 and FIG. 10 and a grommet 1B included in a wire harness WHB according to a modification illustrated in FIG. 11 and FIG. 12 are different from the wire harness WH and the grommet 1 described above in terms of the position of the stress concentration section 54. The other configurations of the wire harnesses WHA and WHB and the grommets 1A and 1B are substantially the same as those of the wire harness WH and the grommet 1 described above.

As illustrated in FIG. 9, FIG. 11 and other drawings, the stress concentration section 54 is typically located on the center axis C side (radially inside) with respect to the first lip section 52 in the annular wall section 51, and located in an area separated by ⅓ or more of a length L2 from the proximal end 51a of the annular wall section 51 on the body 10 side toward the first lip section 52 side along an extension direction D1 of the annular wall section 51. The length L2 corresponds to a length along the extension direction D1 between the proximal end 51a of the annular wall section 51 and the first lip section 52. That is, when an interval between the proximal end 51a of the annular wall section 51 and the first lip section 52 along the extension direction D1 is set as L2, the stress concentration section 54 is typically located in the area separated by 1/3·L2 or more from the proximal end 51a toward the first lip section 52 side along the extension direction D1 and located on the center axis C side (radially inside) with respect to the first lip section 52.

It is common that the insulator 103 provided at a position set back in the radial direction with respect to the edge of the through hole 101 is typically provided in the above area (area separated by 1/3·L2 or more from the proximal end 51a toward the first lip section 52 side) at least in the radial direction in terms of design. Therefore, the stress concentration section 54 tends to be located within the installation region R1 of the insulator 103 together with the first lip section 52 and the second lip section 53 by being provided in the above positional relationship. The stress concentration section 54 included in the aforementioned grommet 1 illustrated in FIG. 5 and other drawings, the stress concentration section 54 included in the grommet 1A illustrated in FIG. 9 and FIG. 10, and the stress concentration section 54 included in the grommet 1B illustrated in FIG. 11 and FIG. 12 are all provided at positions satisfying the above positional relationship. Here, the stress concentration section 54 included in the grommet 1A illustrated in FIG. 9 and FIG. 10 is provided at a position separated by about 1/3·L2 from the proximal end 51a toward the first lip section 52 side along the extension direction D1, and is located on the innermost side of the installation region R1 in the radial direction when viewed along the axial direction X. The stress concentration section 54 included in the grommet 1B illustrated in FIG. 11 and FIG. 12 is provided at a position separated by about 1/2·L2 from the proximal end 51a toward the first lip section 52 side along the extension direction D1, and is located substantially in the center of the first part 51A of the annular wall section 51 and within the installation region R1 when viewed along the axial direction X.

Consequently, in each of the grommets 1, 1A, and 1B, the stress concentration section 54 is provided in the aforementioned positional relationship, so that the first lip section 52, the second lip section 53, and the stress concentration section 54 are all located within the installation region R1 when viewed along the axial direction X. As a result, even when the first lip section 52 and the second lip section 53 ride on the insulator 103 in a state in which the body 10 is fitted into the through hole 101, the stress concentration section 54 is deformed at a proper position as described above, so that the grommets 1, 1A, and 1B can suppress rising of the first lip section 52 and the second lip section 53 from the abutting target surface 104 (surface 103b). As a result, all of the grommets 1, 1A, and 1B can secure a proper installation state.

The stress concentration section 54 described above has been described as including the thin part 54A; however, the present invention is not limited thereto.

Figure 13:
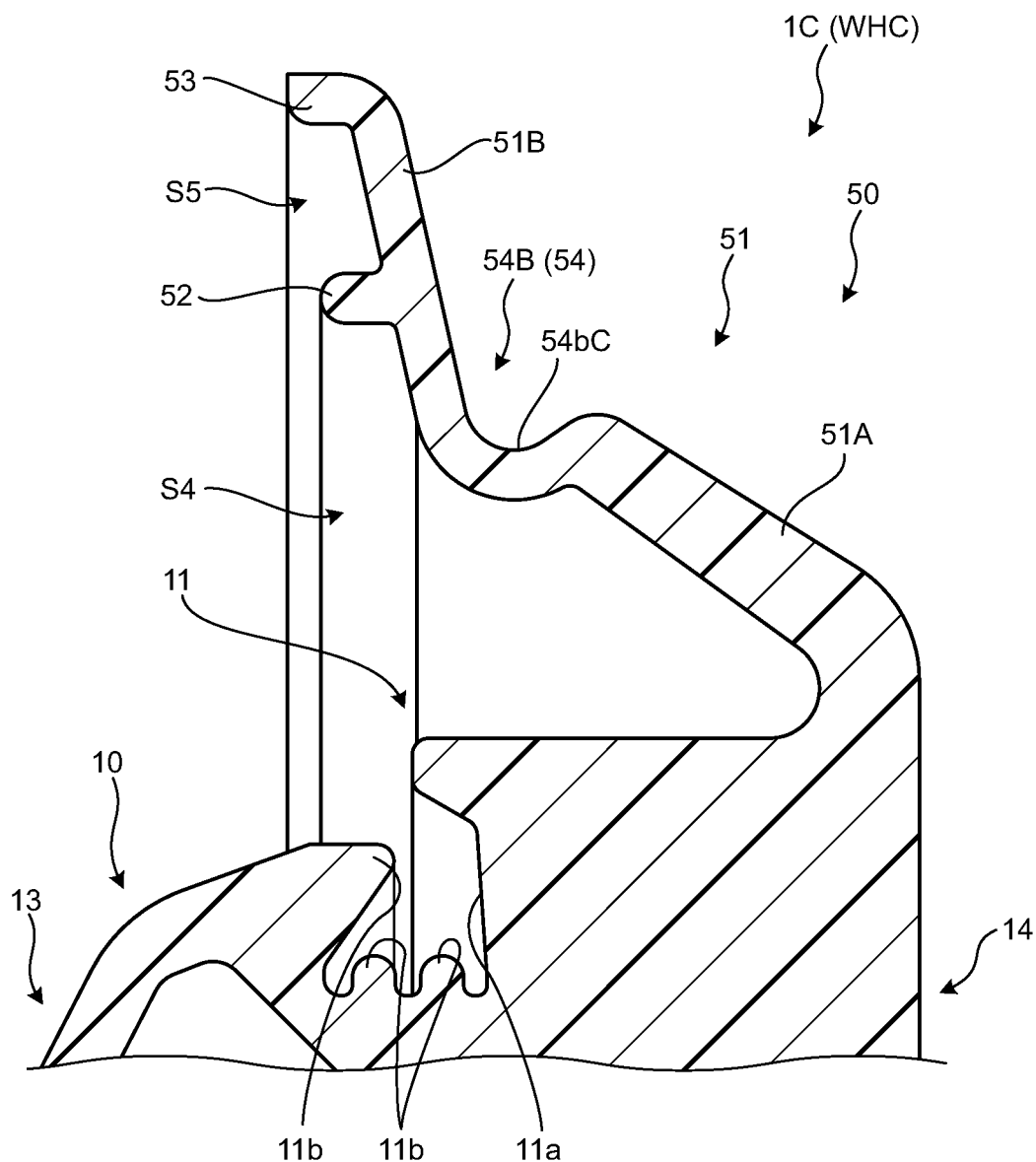
FIG. 13 is a partial sectional view including a stress concentration section of a grommet according to a modification.

A grommet 1C included in a wire harness WHC according to a modification illustrated in FIG. 13, a grommet 1D included in a wire harness WHD according to a modification illustrated in FIG. 14, a grommet 1E included in a wire harness WHE according to a modification illustrated in FIG. 15, and a grommet 1F included in a wire harness WHF according to a modification illustrated in FIG. 16 are different from the wire harness WH and the grommet 1 described above in terms of the shape of the stress concentration section 54. The other configurations of the wire harnesses WHC, WHD, WHE, and WHF and the grommets 1C, 1D, 1E, and 1F are substantially the same as those of the wire harness WH and the grommet 1 described above.

The stress concentration section 54 included in the grommet 1C, the stress concentration section 54 included in the grommet 1D, the stress concentration section 54 included in the grommet 1E, and the stress concentration section 54 included in the grommet 1F are each formed by a bending part 54B. The bending part 54B is a part formed by being bent in the annular wall section 51. The bending part 54B is formed in a substantially annular shape around the center axis C.

The bending part 54B included in the grommet 1C illustrated in FIG. 13 is formed by providing a bending portion 54bC in the middle portion of the first part 51A of the annular wall section 51. The bending portion 54bC is a portion formed by bending the middle portion of the first part 51A of the annular wall section 51, in a curved shape so as to protrude radially inward.

The bending part 54B included in the grommet 1D illustrated in FIG. 14 is formed by providing a bending portion 54bD in the middle portion of the first part 51A of the annular wall section 51. The bending portion 54bD is a portion formed by bending the middle portion of the first part 51A of the annular wall section 51, in a curved shape so as to protrude toward one side in the axial direction X (same side as the protruding side of the first lip section 52 and the second lip section 53).

The bending part 54B included in the grommet 1E illustrated in FIG. 15 is formed by providing a bending portion 54bE in the middle portion of the first part 51A of the annular wall section 51. The bending portion 54bE is a portion formed by bending the middle portion of the first part 51A of the annular wall section 51, in a stepped shape so as to protrude toward the other side in the axial direction X (side opposite to the protruding side of the first lip section 52 and the second lip section 53).

The bending part 54B included in the grommet 1F illustrated in FIG. 16 is formed by providing a bending portion 54bF at a position adjacent to the first lip section 52 and on the inner side in the radial direction in the annular wall section 51. The bending portion 54bF is a portion formed by being bent in a curved shape so as to protrude toward one side in the axial direction X (same side as the protruding side of the first lip section 52 and the second lip section 53) at the position adjacent to the first lip section 52 and on the inner side in the radial direction in the annular wall section 51, and a part of the bending portion 54bF is used as the first lip section 52.

The stress concentration sections 54 of the grommets 1C, 1D, 1E, and 1F include the bending parts 54B formed by the bending portions 54bC, 54bD, 54bE, and 54bF, respectively, and serve as active bending point forming parts like a hinge. Even with such configurations, the stress concentration section 54 can be configured to receive concentrated stress and easily bend before other portions do when a force acts on the annular wall section 51 along the axial direction X in a state in which the body 10 is fitted into the through hole 101 and the first lip section 52 and the second lip section 53 abut the abutting target surface 104.

Even in such a case, all of the grommets 1C, 1D, 1E, and 1F and the wire harnesses WHC, WHD, WHE, and WHF can secure a proper installation state.

A grommet and a wire harness according to the present embodiment may be formed by appropriately combining the components of the embodiment and the modifications described above.

In a grommet and a wire harness according to the present embodiment, a body is fitted into a through hole formed in an attachment target, so that water is stopped from entering the through hole and wiring members are inserted through the through hole. In such a configuration, in the grommet, in a state in which the body is fitted into the through hole, a first lip section and a second lip section provided in an annular wall section of an umbrella-shaped unit abut an abutting target surface provided on the attachment target. At this time, in the grommet, in a state in which the body is fitted into the through hole and the first lip section and the second lip section abut the abutting target surface, stress is concentrated on a stress concentration section provided at a predetermined position in the annular wall section, so that the annular wall section can be bent at the stress concentration section. With such a configuration, the grommet can secure a state in which the first lip section, the second lip section, and the abutting target surface are in proper contact with each other. As a result, the grommet and the wire harness have an effect of being able to secure a proper installation state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
a body that is formed in an annular shape around a center axis thereof that extends in an axial direction of the grommet, and is fitted into a through hole, the through hole being formed in an attachment target, along the axial direction to stop water from entering the through hole, a wiring member being inserted through the body along the axial direction; and
an umbrella-shaped unit including an annular wall section that extends from the body and is formed in an annular shape around the body, a first lip section that protrudes from the annular wall section toward the attachment target along the axial direction and is formed in an annular shape, and a second lip section that protrudes from the annular wall section toward the attachment target along the axial direction and is formed in an annular shape, wherein
the first lip section and the second lip section are provided in the annular wall section so as to be located within an installation region of an insulator provided around the through hole of the attachment target to surround the through hole when viewed along the axial direction, in the umbrella-shaped unit, a gap being provided between the first lip section and the second lip section, the first lip section and the second lip section abutting the abutting target surface of the insulator in a state in which the body is fitted into the through hole, and
the umbrella-shaped unit includes a stress concentration section that is provided in an annular shape in the annular wall section on a radial inner side with respect to the first lip section, is located within the installation region and with the insulator provided between the stress concentration section and the attachment target at least when viewed along the axial direction, and is bendable when receiving concentrated stress in a state in which the body is fitted into the through hole and the first lip section and the second lip section abut the abutting target surface.

2. The grommet according to claim 1, wherein
the stress concentration section includes a thin part formed to have a thickness thinner than thicknesses of other portions in the annular wall section.

3. The grommet according to claim 1, wherein
the stress concentration section includes a bending part formed by being bent in the annular wall section.

4. The grommet according to claim 1, wherein
the stress concentration section is located adjacent to the first lip section and on a radial inner side thereof.

5. The grommet according to claim 2, wherein
the stress concentration section is located adjacent to the first lip section and on a radial inner side thereof.

6. The grommet according to claim 3, wherein
the stress concentration section is located adjacent to the first lip section and a radial inner side thereof.

7. The grommet according to claim 1, wherein
the stress concentration section is located on a radial inner side with respect to the first lip section in the annular wall section, and is located in an area separated from a proximal end of the annular wall section on a side of the body toward a side of the first lip section along an extension direction of the annular wall section by 1/3 or more of a length between the proximal end and the first lip section.

8. The grommet according to claim 2, wherein
the stress concentration section is located on a radial inner side with respect to the first lip section in the annular wall section, and is located in an area separated from a proximal end of the annular wall section on a side of the body toward a side of the first lip section along an extension direction of the annular wall section by 1/3 or more of a length between the proximal end and the first lip section.

9. The grommet according to claim 3, wherein
the stress concentration section is located on a radial inner side with respect to the first lip section in the annular wall section, and is located in an area separated from a proximal end of the annular wall section on a side of the body toward a side of the first lip section along an extension direction of the annular wall section by 1/3 or more of a length between the proximal end and the first lip section.

10. The grommet according to claim 4, wherein
the stress concentration section is located on a radially inner side with respect to the first lip section in the annular wall section, and is located in an area separated from a proximal end of the annular wall section on a side of the body toward a side of the first lip section along an extension direction of the annular wall section by 1/3 or more of a length between the proximal end and the first lip section.

11. The grommet according to claim 5, wherein the stress concentration section is located on a radial inner side with respect to the first lip section in the annular wall section, and is located in an area separated from a proximal end of the annular wall section on a side of the body toward a side of the first lip section along an extension direction of the annular wall section by 1/3 or more of a length between the proximal end and the first lip section.

12. The grommet according to claim 6, wherein the stress concentration section is located on a radial inner side with respect to the first lip section in the annular wall section, and is located in an area separated from a proximal end of the annular wall section on a side of the body toward a side of the first lip section along an extension direction of the annular wall section by 1/3 or more of a length between the proximal end and the first lip section.

13. The grommet according to claim 1, wherein the body includes a portion disposed on an opposite side of the through hole from the umbrella-shape unit and seal against a surface of the attachment target opposite the abutting target surface.

14. The grommet according to claim 1, wherein the first lip section is a radially inner most lip section of the first lip section and the second lip section of the grommet.

15. A wire harness comprising:
a wiring member having conductivity; and
a grommet provided on the wiring member, wherein
the grommet includes:
a body that is formed in an annular shape around a center axis thereof that extends in an axial direction of the grommet, and is fitted into a through hole, the through hole being formed in an attachment target, along the axial direction to stop water from entering the through hole, the wiring member being inserted through the body along the axial direction; and
an umbrella-shaped unit including an annular wall section that extends from the body and is formed in an annular shape around the body, a first lip section that protrudes from the annular wall section toward the attachment target along the axial direction and is formed in an annular shape, and a second lip section that protrudes from the annular wall section toward the attachment target along the axial direction and is formed in an annular shape, wherein
the first lip section and the second lip section are provided in the annular wall section so as to be located within an installation region of an insulator provided around the through hole of the attachment target to surround the through hole when viewed along the axial direction,
in the umbrella-shaped unit, a gap being provided between the first lip section and the second lip section, the first lip section and the second lip section abutting the abutting target surface of the insulator in a state in which the body is fitted into the through hole, and
the umbrella-shaped unit includes a stress concentration section that is provided in an annular shape in the annular wall section on a radial inner side with respect to the first lip section, is located within the installation region and with the insulator provided between the stress concentration section and the attachment target at least when viewed along the axial direction, and is bendable when receiving concentrated stress in a state in which the body is fitted into the through hole and the first lip section and the second lip section abut the abutting target surface.

16. The wire harness according to claim 15, wherein the body includes a portion disposed on an opposite side of the through hole from the umbrella-shape unit and seal against a surface of the attachment target opposite the abutting target surface.

17. The wire harness according to claim 15, wherein the first lip section is a radially inner most lip section of the first lip section and the second lip section of the grommet.

* * * * *